(12) United States Patent
Kano et al.

(10) Patent No.: US 7,058,498 B2
(45) Date of Patent: Jun. 6, 2006

(54) AUTOMATIC CLUTCH CONTROL DEVICE

(75) Inventors: Hiroyuki Kano, Nagoya (JP); Masaki Kinoshita, Kariya (JP); Hiroaki Endo, Shizuoka-ken (JP); Taro Hirose, Susono (JP)

(73) Assignees: Advics Co., Ltd., Kariya (JP); Toyota Jidosha Kabushiki Kaisha, Toyota (JP)

( * ) Notice: Subject to any disclaimer, the term of this patent is extended or adjusted under 35 U.S.C. 154(b) by 99 days.

(21) Appl. No.: 10/699,647

(22) Filed: Nov. 4, 2003

(65) Prior Publication Data

US 2004/0140174 A1 Jul. 22, 2004

(30) Foreign Application Priority Data

Nov. 5, 2002 (JP) ............................. 2002-321203

(51) Int. Cl.
*G06F 7/00* (2006.01)
(52) U.S. Cl. .............................. 701/67; 701/70; 477/39
(58) Field of Classification Search .................. 701/67, 701/70; 192/3.51; 477/39
See application file for complete search history.

(56) References Cited

U.S. PATENT DOCUMENTS

| | | | |
|---|---|---|---|
| 3,898,893 A | 8/1975 | Hashimoto et al. | |
| 4,503,734 A | 3/1985 | Acker | |
| 4,618,043 A | 10/1986 | Hattori et al. | |
| 4,632,231 A | 12/1986 | Hattori et al. | |
| 4,732,055 A | 3/1988 | Tateno et al. | |
| 4,732,246 A | 3/1988 | Tateno et al. | |
| 4,778,038 A | 10/1988 | Ohkawa et al. | |
| 4,831,894 A | 5/1989 | Braun | |
| 4,899,279 A | 2/1990 | Cote et al. | |
| 4,899,857 A | 2/1990 | Tateno et al. | |
| 5,277,286 A | 1/1994 | Yamamoto et al. | |
| 5,403,249 A | 4/1995 | Slicker | |
| 5,439,428 A | 8/1995 | Slicker | |
| 5,487,272 A | 1/1996 | Nagao | |
| 5,590,563 A | 1/1997 | Kuwahata et al. | |
| 5,634,867 A | 6/1997 | Mack | |
| 5,954,176 A * | 9/1999 | Ishihara et al. | ............... 192/83 |
| 6,033,341 A * | 3/2000 | Yamamoto et al. | ......... 477/181 |
| 6,351,700 B1 | 2/2002 | Muramoto et al. | |
| 6,602,161 B1 | 8/2003 | Hemmingsen et al. | |
| 6,769,526 B1 | 8/2004 | Iida et al. | |
| 6,898,504 B1 | 5/2005 | Kadota | |

FOREIGN PATENT DOCUMENTS

JP 60-4461 A 3/1985

(Continued)

*Primary Examiner*—Yonel Beaulieu
(74) *Attorney, Agent, or Firm*—Buchanan Ingersoll PC

(57) ABSTRACT

The automatic clutch control device controls, regardless of the gear-shift operation, the clutch to be brought into a half-clutch state or to a perfect disconnecting state according to a running state of a vehicle from the following five viewpoints deceleration slip amount of driving wheels RL and RR; a convergence time of a driving wheel speed to the driving wheel in a pressure-down mode during a vehicle stabilizing control (for example, ABS control); a continuation time of a judder vibration; whether the vehicle is in a spinning state or not; and whether there is a possibility that an engine stall occurs during a traction control. As a result, this device can attain at least one or more objects of the improvement in stability of the vehicle, improvement in precision of the vehicle stabilizing control, improvement of comfortableness of the occupant and prevention of the occurrence of the engine stall.

11 Claims, 20 Drawing Sheets

FOREIGN PATENT DOCUMENTS

| | | |
|---|---|---|
| JP | 60-44641 A | 3/1985 |
| JP | 60-215435 A | 10/1985 |
| JP | 0060241553 A * | 11/1985 |
| JP | 61-220940 A | 10/1986 |
| JP | 61-235241 A | 10/1986 |
| JP | 62-247931 A | 10/1987 |
| JP | 6-272671 A | 9/1994 |
| JP | 6-272761 A | 9/1994 |
| JP | 8-200399 A | 8/1996 |
| JP | 9-42443 A | 2/1997 |
| JP | 9-79374 A | 3/1997 |
| JP | 9-79394 A | 3/1997 |
| JP | 11-36912 A | 2/1999 |
| JP | 2000-88009 A | 3/2000 |
| JP | 2002122163 A * | 4/2002 |

* cited by examiner

AUTOMATIC CLUTCH CONTROL DEVICE

BACKGROUND OF THE INVENTION

1. Field of the Invention

The present invention relates to an automatic clutch control device that automatically connects/disconnects a clutch disposed between an output shaft of a power source of a vehicle and an input shaft of a transmission of the vehicle.

2. Description of the Prior Arts

There has conventionally been known an automatic clutch control device provided with a clutch connecting/disconnecting actuator for driving a clutch, disposed between an output shaft of a power source of a vehicle and an input shaft of a transmission, so as to be connected and disconnected, wherein, not by an operation of a clutch pedal by a driver but by the clutch connecting/disconnecting actuator, a disconnecting operation for changing the state of the clutch from a connecting state to a disconnecting state is executed before the transmission starts the shift operation and a connecting operation for changing the state of the clutch from the disconnecting state to the connecting state is executed after the shift operation is completed (for example, see the following patent documents 1 and 2).

Further, the patent documents 1 and 2 described below disclose a technique for preventing the occurrence of a stall of an engine by changing the state of the clutch to a half-connecting state (sometimes referred to as "half-clutch state" in this specification) or a disconnecting state regardless of the shift operation of the transmission, when the clutch is in a connecting state and a vehicle body speed is not more than a predetermined speed (e.g., 5 km/h).

[Patent Document 1]
Japanese Unexamined Patent Application No. SHO60-44641

[Patent Document 1]
Japanese Unexamined Patent Application No. HEI9-79374

However, even when a vehicle body speed is great to some degree, there may be a case where the driving wheel is locked to cause an engine stall when, for example, braking force by an engine brake is caused on the driving wheel during when a vehicle is running on a road having a small road friction coefficient. In this case too, it is preferable to bring the clutch into the half-connecting state or the disconnecting state regardless of the shift operation of the transmission.

In other words, even when there is a demand to change the state of the clutch to the half-connecting state or to the disconnecting state regardless of the shift operation of the transmission according to various running states of the vehicle when the clutch is in the connecting state, the conventional device disclosed in the above-mentioned patent documents 1 and 2 has a problem that the state of the clutch cannot suitably be changed to the half-connecting state or the disconnecting state according to the demand.

SUMMARY OF THE INVENTION

Accordingly, an object of the present invention is to provide an automatic clutch control device capable of suitably changing a state of a clutch to a half-connecting state or to a disconnecting state according to various running states of a vehicle.

A first feature of the present invention is that an automatic clutch control device comprising a clutch connecting/disconnecting actuator for driving a clutch, disposed between an output shaft of a power source of a vehicle and an input shaft of a transmission, so as to be connected or disconnected, and clutch control means that controls the clutch connecting/disconnecting actuator comprises wheel speed obtaining means for obtaining a wheel speed of each wheel of the vehicle, deceleration slip related amount obtaining means for obtaining a driving wheel deceleration slip related amount that shows a degree of a slip of the driving wheel in a deceleration direction based upon each wheel speed, wherein the clutch control means is configured to change the state of the clutch to a half-connecting state or to a disconnecting state according to the driving wheel deceleration slip related mount when the clutch is in a connecting state.

The "transmission" here is a manual transmission wherein the shift operation is carried out by an operation of a shift lever by a driver (including the one in which the shift operation is directly executed by the operation of the shift lever by the driver and the one in which the shift operation is executed by an actuator for a gear shift based upon a signal indicating the position of the shift lever operated by the driver), or an automatic transmission wherein the shift operation is automatically carried out according to a running state of the vehicle, not by the operation of the shift lever by the driver (the same theory is applied to second to fifth features of the present invention described later). Further, the "clutch" here does not include the one disposed in the transmission in order to execute the shift operation (the same theory is applied to the second to fifth features of the present invention described later).

Moreover, "the slip of the driving wheel in the deceleration direction" is a slip generated in case where the driving wheel speed is slower than the vehicle body speed (in case where the driving wheel causes braking force on the vehicle) (hereinafter sometimes referred to as "deceleration slip" hereinbelow). Further, "the driving wheel deceleration slip related amount" is an amount showing a degree of a slip of the driving wheel in the deceleration direction, and it is, for example, a slip ratio (e.g., a ratio of a value obtained by subtracting a driving wheel speed from a vehicle body speed to the vehicle body speed) and a slip amount (e.g., a value obtained by subtracting the driving wheel speed from the vehicle body speed), but not limited thereto.

Additionally, "the clutch is in the connecting state" corresponds to a case where a slip dose not occur on a clutch (on a frictional face of a clutch disc) and the clutch is in a state of being capable of transmitting all power generated from the power source to the transmission, and consequently, to the driving wheel (by rotating the input shaft of the transmission with a revolution speed same as that of the output shaft of the power source), while "the clutch is in the half-connecting state" corresponds to a case where a slip occurs on the clutch and the clutch is in a state of being capable of partially transmitting power generated from the power source to the transmission, and consequently, to the driving wheel (by rotating the input shaft of the transmission with a revolution speed slower than that of the output shaft of the power source). "The clutch is in the disconnecting state" corresponds to a case where the clutch is in a state of being incapable of transmitting power generated from the power source to the transmission, and consequently, to the driving wheel (the same theory is applied to the second to fifth features of the present invention described later).

As explained above, when braking force (in case the power source is an internal combustion engine, braking force by an engine brake, and in case the power source is an electric motor, braking force by a regenerative brake) generated by the power source is exerted on the driving wheel during when the vehicle is running on a road having a small road friction coefficient, for example, there is a possibility that the vehicle becomes unstable due to the occurrence of the deceleration slip on the driving wheel when the clutch is kept to be in the connecting state. When the degree of the deceleration slip of the driving wheel becomes excessively great, the driving wheel is locked, resulting in that an engine stall may be caused in case where the power source is the internal combustion engine.

On the other hand, a configuration is applied for changing the state of the clutch to the half-connecting state or to the disconnecting state according to the driving wheel deceleration slip related amount (regardless of the shift operation of the transmission) when the clutch is in the connecting state as described above. Therefore, the braking force exerted on the driving wheel from the power source can be reduced or eliminated when the clutch is in the connecting state and the driving wheel deceleration slip related amount is caused, i.e., when the deceleration slip occurs on the driving wheel due to the braking force generated by the power source. As a result, the increase in the degree of the deceleration slip of the driving wheel can be avoided, so that a stability of the vehicle can satisfactorily be maintained, and further, the occurrence of the engine stall can be prevented in case where the power source is the internal combustion engine.

In this case, the clutch control means is preferably configured to change the state of the clutch to the half-connecting state in case where the degree of the slip of the driving wheel in the deceleration direction represented by the driving wheel deceleration slip related amount is not less than a first degree but less than a second degree that is greater than the first degree, while to change the state of the clutch to the disconnecting state in case where the degree of the slip is not less than the second degree.

This configuration can increase the degree of reducing the braking force exerted on the driving wheel from the power source according to the increase of the degree of the slip of the driving wheel in the deceleration direction. Therefore, the clutch is not unnecessary brought into the disconnecting state, thereby being capable of effectively exerting braking force (braking force by an engine brake, braking force by a regenerative brake) generated by the power source while maintaining the stability of the vehicle.

Further, a second feature of the invention is that, in case where a vehicle, to which the automatic clutch control device provided with the above-mentioned clutch connecting/disconnecting actuator and the clutch control means is applied, comprises vehicle stabilizing control executing means for setting a target wheel speed related amount of each wheel in accordance with a running state of the vehicle and executing a vehicle stabilizing control for controlling braking force exerted on each wheel such that an actual wheel speed related amount of each wheel becomes the target wheel speed related amount, the automatic clutch control device comprises convergence rate obtaining means for obtaining a convergence rate showing a quality of the convergence of the actual wheel speed related amount of a driving wheel when the actual wheel speed related amount of the driving wheel converges to the target wheel speed related amount of the driving wheel from a state where the actual wheel speed of the driving wheel is smaller than the wheel speed corresponding to the target wheel speed related amount of the driving wheel when the vehicle stabilizing control is executed, wherein the clutch control means is configured to change the state of the clutch to the half-connecting state or to the disconnecting state according to the convergence rate when the vehicle stabilizing control is executed and the clutch is in the connecting state.

The "vehicle stabilizing control" here is, for example, a so-called ABS control, so-called oversteer and understeer suppressing control or the like. Further, the "wheel speed related amount" is, for example, a wheel speed, slip ratio (e.g., a ratio of a value obtained by subtracting a vehicle body speed from a wheel speed to the vehicle body speed), and a slip amount (e.g., a value obtained by subtracting the vehicle body speed from the wheel speed), but not limited thereto.

Moreover, "convergence rate showing a quality of the convergence" is a convergence period or the like, from when the vehicle stabilizing control is started such that the actual wheel speed related amount of the driving wheel is converged to the target wheel speed related amount from a state where the actual wheel speed of the driving wheel is smaller than the wheel speed corresponding to the target wheel speed related amount of the driving wheel, to when the actual wheel speed related amount is completed to be converged to the target wheel speed related amount, but not limited thereto.

When the vehicle stabilizing control is executed in case where the deceleration slip occurs on the driving wheel and the actual wheel speed of the driving wheel is smaller than the wheel speed corresponding to the target wheel speed related amount of the driving wheel, the braking force exerted on the driving wheel is normally decreased to thereby increase the wheel speed of the driving wheel due to the friction force from the road surface, whereby a control is executed such that the actual wheel speed of the driving wheel is converged to the wheel speed corresponding to the target wheel speed related amount.

In this case, when great braking force (braking force by the engine brake, braking force by the regenerative brake) is exerted on the driving wheel from the power source and the clutch is kept to be in the connecting state, such braking force becomes a great disturbance when the vehicle is running, in particular, on the road surface with a small road friction coefficient, i.e., the road surface having small friction force therefrom, whereby there may be a case that the wheel speed of the driving wheel does not immediately increase. In this case, it takes much time for the actual wheel speed of the driving wheel to increase and converge to the wheel speed corresponding to the target wheel speed related amount, thereby being difficult to precisely execute the vehicle stabilizing control.

On the other hand, the device is configured to change the state of the clutch to the half-clutch state or to the disconnecting state according to the aforesaid convergence rate (for example, convergence time) as described above when the vehicle stabilizing control is executed and the clutch is in the connecting state. Therefore, when the clutch is in the connecting state and the aforesaid convergence rate becomes a value showing that the convergence is poor (for example, when the aforesaid convergence time is long), i.e., when the braking force generated by the power source becomes a great disturbance to the vehicle stabilizing control, the braking force exerted on the driving wheel from the power source can be reduced or eliminated, resulting in being capable of avoiding that the convergence is further deteriorated (that the convergence time becomes longer) when the actual wheel speed of the driving wheel increases to converge to the wheel speed corresponding to the target wheel speed related amount. Consequently, the precision of the vehicle stabilizing control can be assured and the stability of the vehicle can be maintained.

In this case, the clutch control means is preferably configured to change the state of the clutch to the half-connecting state when the degree of the deterioration of the convergence represented by the convergence rate is not less than a first degree but less than a second degree that is greater than the first degree, and to change the state of the clutch to the disconnecting state when the degree of the deterioration is not less than the second degree.

This can increase the degree of decreasing the braking force exerted on the driving wheel from the power source according to the increase of the degree of the deterioration of the convergence. Accordingly, the clutch is not unnecessary brought into the disconnecting state, thereby being capable of effectively exerting braking force (braking force by an engine brake, braking force by a regenerative brake) generated by the power source while maintaining the precision of the vehicle stabilizing control.

A third feature of the invention is that the automatic clutch control device including the clutch connecting/disconnecting actuator and the clutch control means comprises driving system vibration determining means for determining whether a predetermined vibration occurs on a driving system from the power source to a driving wheel when the clutch is in the connecting state and the vehicle is accelerated by the power from the power source, wherein the clutch control means is configured to change the state of the clutch to the half-connecting state or to the disconnecting state according to the degree of the predetermined vibration when the clutch is in the connecting state and the predetermined vibration occurs. The "degree of the predetermined vibration" is, for example, a continuation time of the predetermined vibration here, but not limited thereto.

When the vehicle is accelerated by the power from the power source with the clutch kept to be in the connecting state, it is well-known that the predetermined vibration (so-called "judder vibration") may occur on each component composing the driving system from the power source to the driving wheel. When the clutch is kept to be in the connecting state in this case, the predetermined vibration continuously occurs on the vehicle, resulting in giving to an occupant of the vehicle uncomfortable feeling, and further, giving an adverse affect, such as deterioration in durability, to each component composing the driving system.

On the other hand, the device is configured to change the state of the clutch to the half-connecting state or to the disconnecting state according to the degree of the predetermined vibration (for example, the continuation time of the predetermined vibration) when the clutch is in the connecting state and the predetermined vibration occurs. Therefore, when the clutch is in the connecting state and the predetermined vibration occurs, the power from the power source that is transmitted by the driving system to the driving wheel can be reduced or eliminated, resulting in avoiding that the predetermined vibration further continues (that the continuation time of the predetermined vibration becomes longer), thereby being capable of assuring comfortableness of the occupant of the vehicle and preventing the deterioration in durability of each component composing the driving system.

A fourth feature of the invention is that the automatic clutch control device provided with the clutch connecting/disconnecting actuator and the clutch control means comprises spinning state determining means for determining whether the vehicle is in a spinning state or not, wherein the clutch control means is configured to change the state of the clutch to the half-connecting state or to the disconnecting state when the clutch is in the connecting state and the vehicle is in the spinning state.

When the vehicle is in the spinning state, a driver strongly operates the brake pedal BP to exert strong braking force on each wheel including the driving wheel, whereby there may be a case that the driving wheel is locked (the revolution of the driving wheel is stopped). When the clutch is kept to be in the connecting state in this case, the revolution of the power source also stopped, whereby the engine stall occurs in case where the power source is an internal combustion engine.

On the other hand, the device is configured to change the state of the clutch to the half-connecting state or to the disconnecting state when the clutch is in the connecting state and the vehicle is in the spinning state. Therefore, when the clutch is in the connecting state and the vehicle is in the spinning state, a torque for stopping the revolution of the power source transmitted to the power source from the driving wheel via the clutch can be reduced or eliminated. As a result, the occurrence of the engine stall can be prevented, in case where the power source is the internal combustion engine.

Further, a fifth feature of the invention is that, in case where a vehicle, to which the automatic clutch control device provided with the above-mentioned clutch connecting/disconnecting actuator and the clutch control means is applied, comprises traction control executing means for setting a target wheel speed related amount of a driving wheel when a slip of the driving wheel in an accelerating direction excessively occurs and executing a traction control for controlling braking force exerted on the driving wheel such that an actual wheel speed related amount of the driving wheel becomes the target wheel speed related amount, the automatic clutch control device comprises revolution speed obtaining means for obtaining a revolution speed of the power source, wherein the clutch control means is configured to change the state of the clutch to the half-connecting state or to the disconnecting state when the clutch is in the connecting state, the traction control is executed and the revolution speed is not more than a predetermined value. The "slip of the driving wheel in the accelerating direction" is here a slip (hereinafter sometimes referred to as "acceleration slip") generated in case where the driving wheel speed is greater than the vehicle body speed (in case where the driving wheel produces accelerating force (speed-up force) on the vehicle).

When a well-known traction control is executed in case where the acceleration slip is excessively generated on the driving wheel so that the actual wheel speed of the driving wheel becomes excessively greater than the wheel speed corresponding to the target slip ratio of the driving wheel, braking force is normally exerted on the driving wheel, resulting in that the wheel speed of the driving wheel is decreased, and therefore, the actual wheel speed of the driving wheel is controlled to be decreased to thereby be converged to the wheel speed corresponding to the target slip ratio.

In this case, the driving wheel may be locked due to the exerted braking force when, in particular, the vehicle is running on a road surface with a small road friction coefficient. When the clutch is kept to be in the connecting state in this case, the revolution of the power source is stopped and the engine stall occurs in case where the power source is the internal combustion engine.

On the other hand, the device is configured to change the state of the clutch to the half-connecting state or to the disconnecting state when the clutch is in the connecting state, the traction control is executed and the revolution speed of the power source is not more than the predetermined value. Therefore, when the clutch is in the connecting state, the traction control is executed and the revolution speed of the power source is not more than the predetermined value, a torque for stopping the revolution of the power source transmitted to the power source from the driving wheel via the clutch can be reduced or eliminated. As a result, the occurrence of the engine stall can be prevented, in case where the power source is the internal combustion engine.

BRIEF DESCRIPTION OF THE DRAWINGS

FIG. 7 is a flowchart showing a routine, executed by the CPU shown in FIG. 1, for calculating a wheel speed or the like;

DESCRIPTION OF THE PREFERRED EMBODIMENT

Figure 1:
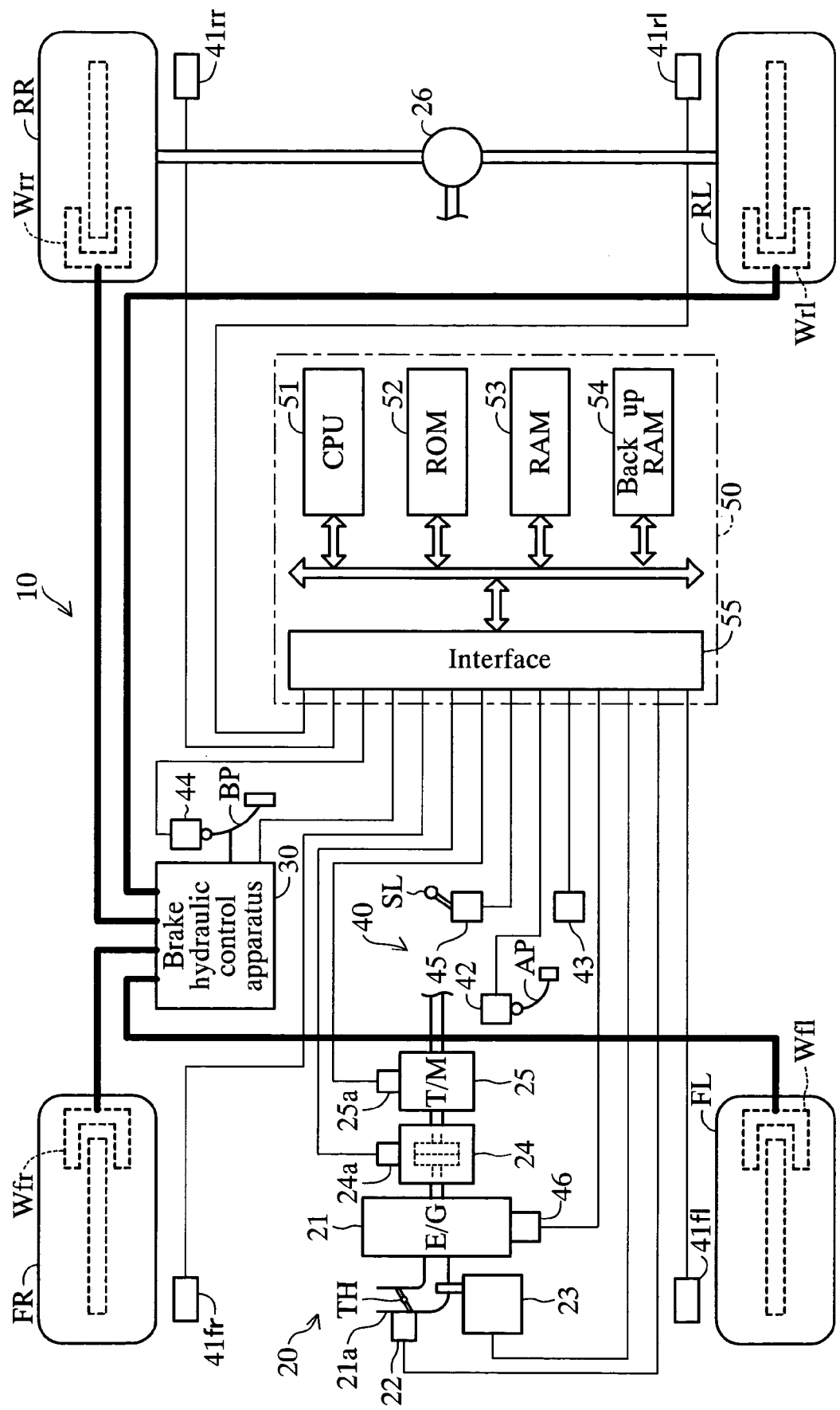
FIG. 1 is a schematic constructional view of a vehicle provided with an automatic clutch control device for a vehicle according to an embodiment of the present invention.

A preferred embodiment of an automatic clutch control device for a vehicle according to the present invention will be explained hereinbelow with reference to drawings. FIG. 1 shows a schematic construction of a vehicle provided with a control device 10 for a vehicle including an automatic clutch control device according to the embodiment of the invention. This vehicle is a four-wheel drive vehicle using a rear-wheel drive system and having two front wheels (front-left wheel FL and front-right wheel FR) that are non-driving wheels and two rear wheels (rear-left wheel RL and read-right wheel RR) that are driving wheels.

The control device 10 for the vehicle is configured to include a driving force transmission section 20 that produces driving force and respectively transmits this driving force to each driving wheel RL and RR, a brake hydraulic control apparatus 30 for producing braking force by a brake fluid pressure on each wheel, a sensor section 40 composed of various sensors and an electrical control apparatus 50.

The driving force transmission section 20 is configured to include an engine 21 as a power source that produces driving force, a throttle valve actuator 22 arranged in an inlet pipe 21a of the engine 21 and having a DC motor for controlling an opening of a throttle valve TH that can modulate the cross-sectional area of the inlet path, a fuel injection device 23 including an injector that injects fuel to the vicinity of an inlet port not shown of the engine 21, a clutch 24 whose input shaft is connected to an output shaft of the engine 21, a transmission 25 whose input shaft is connected to the output shaft of the clutch and a differential gear 26 that suitably distributes and transmits driving force transmitted from the output shaft of the transmission 25 to rear wheels RR and RL.

The clutch 24 is a friction clutch that transmits power from the engine 21 to the transmission 25 by frictional force, according to press-contact force F, produced by exerting the press-contact force F based upon urging force F1 of a clutch spring not shown on a frictional face of a clutch disc. This press-contact force F can be adjusted by a clutch connecting/disconnecting actuator 24a operated by oil pressure that is produced by utilizing a hydraulic circuit not shown.

More specifically, the clutch connecting/disconnecting actuator 24a is configured to produce driving force for decreasing the press-contact force F exerted on the frictional face of the clutch disc. Accordingly, the press-contact force F has the maximum value F1 that is equal to the urging force F1 of the clutch spring in a state where the clutch connecting/disconnecting actuator 24a does not generate the driving force. In this case, the clutch 24 is brought into a perfect connecting state (hereinafter referred to as a "perfect connecting state") wherein a slip does not occur on the frictional face of the clutch disc and all power from the engine 21 is transmitted to the transmission 25 (i.e., to the driving wheels RL and RR).

Further, the press-contact force F decreases as the driving force of the clutch connecting/disconnecting actuator 24a increases. In a state where the press-contact force is greater than "0" but smaller than the maximum value F1, the clutch 24 is brought into a half-connecting state (hereinafter referred to as "half-clutch state") wherein a slip can be generated on the frictional face of the clutch disc and a part of the power from the engine 21 can be transmitted to the transmission 25.

When the driving force from the clutch connecting/disconnecting actuator 24a becomes not less than a predetermined value, the press-contact force F becomes "0". In this case, the clutch 24 is brought into a perfect disconnecting state (hereinafter referred to as a "perfect disconnecting state") wherein the power from the engine 21 cannot be transmitted to the transmission 25.

Further, when the clutch 24 is in the perfect connecting state, the clutch connecting/disconnecting actuator 24a outputs a signal for indicating that the clutch 24 is in the perfect connecting state, and when the clutch 24 is in the perfect disconnecting state, the clutch connecting/disconnecting actuator 24a outputs a signal for indicating that the clutch 24 is in the perfect disconnecting state. In this way, the state of the clutch 24 can be changed by adjusting the driving force from the clutch connecting/disconnecting actuator 24a, not by an operation of a clutch pedal by a driver.

The transmission 25 has plural (for example, seven stages) forward gear stages for travelling forward, reverse gear stage for travelling backward and neutral gear stage. A combination of internal plural trains of gear is changed by a gear-shift actuator 25a operated by oil pressure that is generated by utilizing the hydraulic circuit not shown, whereby any one of the above-mentioned stages is selected. Further, when the gear-shift operation is completed, the gear-shift actuator 25a outputs a signal for indicating that the gear-shift operation is completed.

Figure 2:
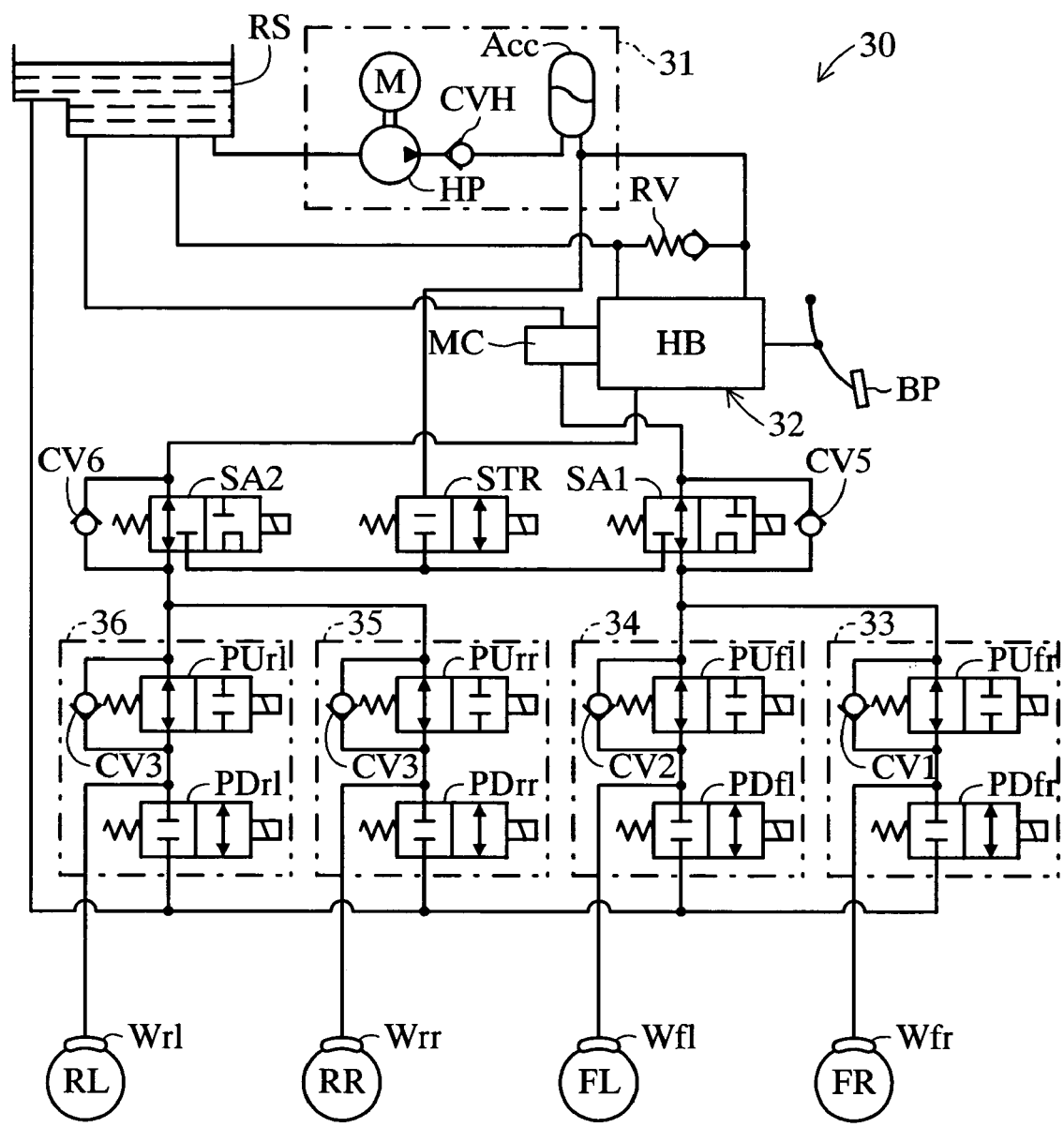
FIG. 2 is a schematic constructional view of a brake hydraulic control apparatus shown in FIG. 1.

The brake hydraulic control apparatus 30 whose construction is schematically shown in FIG. 2 is configured to include a high-pressure generating section 31, a brake fluid pressure generating section 32 that generates brake fluid pressure according to operating force on a brake pedal BP, and an FR brake fluid pressure adjusting section 33, an FL brake fluid pressure adjusting section 34, an RR brake fluid pressure adjusting section 35 and an RL brake fluid pressure adjusting section 36 that are capable of adjusting brake fluid pressure supplied respectively to wheel cylinders Wfr, Wfl, Wrr and Wrl each arranged at each wheel FR, FL, RR and RL.

The high-pressure generating section 31 is configured to include an electric motor M, a hydraulic pump HP driven by the electric motor M and pressurizing brake fluid in a reservoir RS and an accumulator Acc that is connected to the discharge side of the hydraulic pump HP via a check valve CVH and stores brake fluid pressurized by the hydraulic pump HP.

The electric motor M is driven when the fluid pressure in the accumulator Acc is less than a predetermined lower limit value, while it is halted when the fluid pressure in the accumulator Acc exceeds a predetermined upper limit value. By this, the fluid pressure in the accumulator Acc is always kept high within a predetermined range.

A relief valve RV is arranged between the accumulator Acc and the reservoir RS. When the fluid pressure in the accumulator Acc becomes extraordinarily higher than the above-mentioned high pressure, the brake fluid in the accumulator Acc is returned to the reservoir RS. This operation protects a hydraulic circuit in the high-pressure generating section 31.

The brake hydraulic generating section 32 is composed of a hydraulic booster HB that is driven according to the operation of the brake pedal BP and a master cylinder MC connected to the hydraulic booster HB. The hydraulic booster HB assists the operating force on the brake pedal BP at a predetermined ratio by utilizing the above-mentioned high pressure supplied from the high-pressure generating section 31 and transmits the assisted operating force to the master cylinder MC.

The master cylinder MC generates master cylinder fluid pressure according to the assisted operating force. Further, the hydraulic booster HB, by inputting this master cylinder fluid pressure, generates regulator fluid pressure that is approximately equal to the master cylinder fluid pressure according to the assisted operating force. The constructions and operations of the master cylinder MC and hydraulic booster HB are well known, so that their detailed explanations are omitted here. As described above, the master cylinder MC and hydraulic booster HB respectively generate master cylinder fluid pressure and regulator fluid pressure according to the operating force on the brake pedal BP.

A control valve SA1 that is a three-port two-position switching type solenoid-operated valve is arranged between the master cylinder MC and each of the upstream side of the FR brake fluid pressure adjusting section 33 and the upstream side of the FL brake fluid pressure adjusting section 34. Similarly, a control valve SA2 that is a three-port two-position switching type solenoid-operated valve is arranged between the hydraulic booster HB and each of the upstream side of the RR brake fluid pressure adjusting section 35 and the upstream side of the RL brake fluid pressure adjusting section 36. Further, a change-over valve STR that is a two-port two-position switching type, normally closed, solenoid-operated on-off valve is arranged between the high-pressure generating section 31 and each of the control valve SA1 and the control valve SA2.

When the control valve SA1 is in the first position in FIG. 2 (in the non-actuated position), it functions to establish communication between the master cylinder MC and each of the upstream section of the FR brake fluid pressure adjusting section 33 and the upstream section of the FL brake fluid pressure adjusting section 34. When in the second position (in the actuated position), it functions to cut off the communication between the master cylinder MC and each of the upstream section of the FR brake fluid pressure adjusting section 33 and the upstream section of the FL brake fluid pressure adjusting section 34, but establish the communication between the change-over valve STR and each of the upstream section of the FR brake fluid pressure adjusting section 33 and the upstream section of the FL brake fluid pressure adjusting section 34.

When the control valve SA2 is in the first position in FIG. 2 (in the non-actuated position), it functions to establish communication between the hydraulic booster HB and each of the upstream section of the RR brake fluid pressure adjusting section 35 and the upstream section of the RL brake fluid pressure adjusting section 36. When in the second position (in the actuated position), it functions to cut off the communication between the hydraulic booster HB and each of the upstream section of the RR brake fluid pressure adjusting section 35 and the upstream section of the RL brake fluid pressure adjusting section 36, but establish the communication between the change-over valve STR and each of the upstream section of the RR brake fluid pressure adjusting section 35 and the upstream section of the RL brake fluid pressure adjusting section 36.

By this operation, master cylinder fluid pressure is supplied to each of the upstream section of the FR brake fluid pressure adjusting section 33 and the upstream section of the FL brake fluid pressure adjusting section 34 when the control valve SA1 is placed at the first position, while high pressure generated from the high-pressure generating section 31 is supplied thereto when the control valve SA1 is placed at the second position and the change-over valve STR is placed at the second position (at the actuated position).

Similarly, regulator fluid pressure is supplied to each of the upstream section of the RR brake fluid pressure adjusting section 35 and the upstream section of the RL brake fluid pressure adjusting section 36 when the control valve SA2 is placed at the first position, while high pressure generated from the high-pressure generating section 31 is supplied thereto when the control valve SA2 is placed at the second position and the change-over valve STR is placed at the second position.

The FR brake fluid pressure adjusting section 33 is composed of a pressure increasing valve PUfr that is a two-port two-position switching type, normally opened, solenoid-operated on-off valve and a pressure reducing valve PDfr that is a two-port two-position switching type, normally closed, solenoid-operated on-off valve. The pressure increasing valve PUfr, when placed at the first position in FIG. 2 (at the non-actuated position), establishes a communication between the upstream section of the FR brake fluid pressure adjusting section 33 and the wheel cylinder Wfr, while it cuts off the communication between the upstream section of the FR brake fluid pressure adjusting section 33 and the wheel cylinder Wfr when placed at the second position (at the actuated position). The pressure reducing valve PDfr cuts off the communication between the wheel cylinder Wfr and the reservoir RS when it is placed at the first position in FIG. 2 (at the non-actuated position), while it establishes the communication between the wheel cylinder Wfr and the reservoir RS when placed at the second position (at the actuated position).

By this operation, the brake fluid pressure in the wheel cylinder Wfr is increased when the pressure increasing valve PUfr and the pressure reducing valve PDfr are placed at the first position since the fluid pressure at the upstream section of the FR brake fluid pressure adjusting section 33 is supplied into the wheel cylinder Wfr. When the pressure increasing valve PUfr is placed at the second position and the pressure reducing valve PDfr is placed at the first position, the brake fluid pressure in the wheel cylinder Wfr is kept to be the fluid pressure at the time in the wheel cylinder Wfr regardless of the fluid pressure at the upstream section of the FR brake fluid pressure adjusting section 33. When the pressure increasing valve PUfr and the pressure reducing valve PDfr are placed at the second position, the brake fluid in the wheel cylinder Wfr is returned to the reservoir RS to thereby reduce the fluid pressure.

A check valve CV1 is arranged in parallel to the pressure increasing valve PUfr for allowing only one-way flow of the brake fluid from the wheel cylinder Wfr side to the upstream section of the FR brake fluid pressure adjusting section 33. This arrangement brings a rapid reduction of the brake fluid pressure in the wheel cylinder Wfr when the released brake pedal BP is opened with the control valve SA1 placed at the first position.

Similarly, the FL brake fluid pressure adjusting section 34, RR brake fluid pressure adjusting section 35 and RL brake fluid pressure adjusting section 36 are respectively composed of a pressure increasing valve PUfl and pressure reducing valve PDfl, a pressure increasing valve PUrr and pressure reducing valve PDrr and a pressure increasing valve PUrl and pressure reducing valve PDrl. The position of each pressure increasing valve and pressure reducing valve is controlled, whereby the brake fluid pressure in the wheel cylinder Wfl, wheel cylinder Wrr and wheel cylinder Wrl can be increased, kept and reduced. Further, check valves CV2, CV3 and CV4 that can attain the function same as that of the check valve CV1 are respectively arranged in parallel to the pressure increasing valves PUfl, PUrr and PUrl.

A check valve CV5 is arranged in parallel to the control valve SA1 for allowing only one-way flow of the brake fluid from the upstream side to the downstream side. When the control valve SA1 is placed at the second position and the communication between the master cylinder MC and each of the FR brake fluid pressure adjusting section 33 and the FL brake fluid pressure adjusting section 34 is cut off, the brake fluid pressure in the wheel cylinders Wfr and Wfl can be increased by operating the brake pedal BP. Further, arranged in parallel to the control valve SA2 is a check valve CV6 that can attain the function same as that of the check valve CV5.

By the construction described above, the brake hydraulic control apparatus 30 can supply brake fluid pressure according to the operating force on the brake pedal BP to each wheel cylinder when all the solenoid-operated valves are in the first position. Further, under this state, it can reduce, for example, only the brake fluid pressure in the wheel cylinder Wrr by a predetermined amount by controlling the pressure increasing valve PUrr and pressure reducing valve PDrr.

By changing the control valve SA1, change-over valve STR and pressure increasing valve PUfl to the second position and controlling the pressure increasing valve PUfr and pressure reducing valve PDfr respectively, the brake hydraulic control apparatus 30 can increase only the brake fluid pressure in the wheel cylinder Wfr by a predetermined value by utilizing the high pressure generated from the high-pressure generating section 31 while the brake fluid pressure in the wheel cylinder Wfl is maintained under a state where the brake pedal BP is not operated (is released). As described above, the brake hydraulic control apparatus 30 independently controls the brake fluid pressure in the wheel cylinder of each wheel regardless of the operation on the brake pedal BP, thereby being capable of exerting predetermined braking force on every independent wheel.

Referring again to FIG. 1, the sensor section 40 is composed of wheel speed sensors 41fl, 41fr, 41rl and 41rr as wheel speed obtaining means, each constructed by a rotary encoder that outputs a signal having a pulse every time each wheel FL, FR, RL and RR rotates at a predetermined angle, an accelerator opening sensor 42 that detects an operating amount of an accelerator pedal AP operated by a driver and outputs a signal showing the operating amount Accp of the accelerator pedal AP, a yaw rate sensor 43 that detects a yaw rate which is a rate of change of a rotational angle of a vehicle around a vertical shaft passing through a center of gravity of a vehicle and outputs a signal showing a yaw rate Yr, a brake switch 44 that detects whether the brake pedal BP is operated or not by the driver for outputting a signal showing that the braking operation is performed or not, a shift position sensor 45 that detects the position of a shift lever SL operated by the driver for outputting a signal showing the position of the shift lever SL and a revolution speed sensor 46, as revolution speed obtaining means, that outputs a signal showing a revolution speed Ne of the engine 21.

Figure 3:
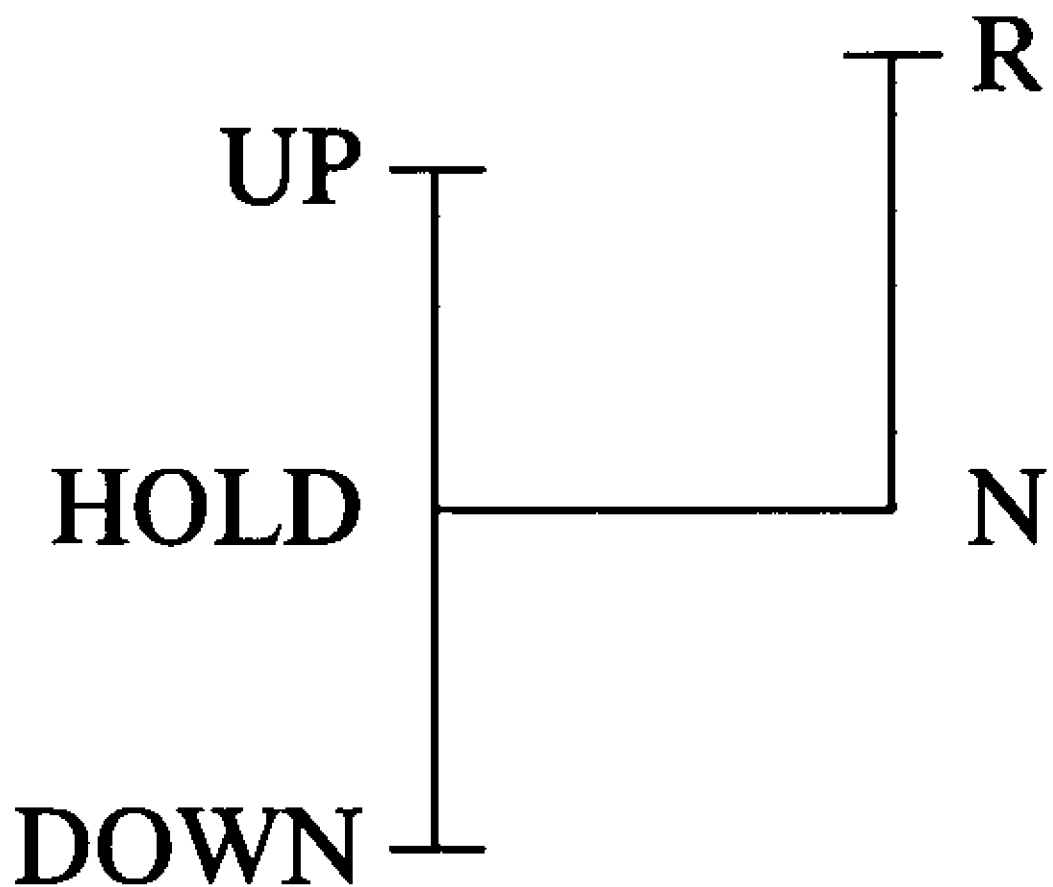
FIG. 3 is a view showing a shift pattern of a shift lever shown in FIG. 1.

As shown in FIG. 3, the shift lever SL can be moved to an N (neutral) position, R (reverse) position, HOLD (hold) position, UP (up) position and DOWN (down) position, and it is held at any one of the N position, R position and HOLD position so long as external force such as control force or the like by the driver is not exerted when it is at the aforesaid any one of the positions. Further, when the shift lever SL is at the UP position or DOWN position, restoring force to the HOLD position is exerted on the shift lever SL, so that the shift lever SL moved to the UP position or DOWN position by the external force such as the control force or the like by the driver is automatically returned to the HOLD position when the external force is not exerted thereon.

The shift position sensor 45 outputs a signal (hereinafter referred to as "N signal") for bringing the transmission 25 into a state where the neutral gear stage is selected, when the shift lever SL is moved to the N position, while it outputs a signal (hereinafter referred to as "R signal") for bringing the transmission 25 into a state where the reverse gear stage is selected, when the shift lever SL is moved to the R position. Moreover, the shift position sensor 45 outputs a signal (hereinafter referred to as "HOLD signal") for maintaining the transmission 25 into a state at present where the forward gear stage is selected, when the shift lever SL is moved to the HOLD position.

Further, the shift position sensor 45 outputs a signal (hereinafter referred to as "UP signal") for bringing the transmission 25 into a state where the forward gear that is the next gear of the forward gear at present toward the high-speed side is selected, when the shift lever SL is moved to the UP position, while it outputs a signal (hereinafter referred to as "DOWN signal") for bringing the transmission 25 into a state where the forward gear that is the next gear of the forward gear at present toward the low-speed side is selected, when the shift lever SL is moved to the DOWN position.

The electrical control apparatus 50 is a microcomputer including a CPU 51, a ROM 52 that stores in advance a routine (program) executed by the CPU 51, table (look-up table, map), constant or the like, a RAM 53 to which the CPU 51 temporarily stores data as needed, a back-up RAM 54 that stores data with a power supply turned on and holds the stored data even during a period when the power supply is turned off and an interface 55 including an AD converter, those of which are connected to one another with a bus.

The interface 55 is connected to the clutch connecting/disconnecting actuator 24a, gear shift actuator 25a, brake hydraulic control apparatus 30 and the sensors 41 to 46, thereby supplying to the CPU 51 signals from the sensors 41 to 46 and transmitting a driving signal to the throttle valve actuator 22, the fuel injection device 23, clutch connecting/disconnecting actuator 24a, gear shift actuator 25a and each solenoid-operated valve and motor M of the brake hydraulic control apparatus 30 according to the instruction from the CPU 51.

By this operation, the throttle valve actuator 22 drives the throttle valve TH so as to obtain an opening thereof according to the operating amount Accp of the accelerator pedal AP, and the fuel injection device 23 injects fuel in a required amount so as to obtain a predetermined target air-fuel ratio (theoretical air-fuel ratio) concerning intake air mass according to the opening of the throttle valve TH. Further, the gear shift actuator 25a selects the stage of the transmission 25 based upon the output from the shift position sensor 45.

[Outline of clutch connecting/disconnecting control upon gear-shit and gear-shift control]

The control device 10 (simply referred sometimes to as "this device" hereinbelow) for a vehicle including the automatic clutch control device according to the present invention controls the driving force of the clutch connecting/disconnecting actuator 24a for driving the clutch 24 so as to be connected or disconnected, in order to perform a gear-shift operation (shift operation of the transmission) for changing the forward gear stage of the transmission 25 when the shift lever SL is operated by the driver and the above-mentioned UP signal or DOWN signal is outputted from the shift position sensor 45.

When the above-mentioned N signal, R signal and HOLD signal are outputted from the shift position sensor 45, when a vehicle is stopped, when the vehicle starts to move, or when the vehicle runs at very low speed, this device controls the clutch 24 based upon a well-known technique according to need, but in the present specification, the detailed explanation of the control of the clutch 24 in these cases is omitted.

Figure 4:
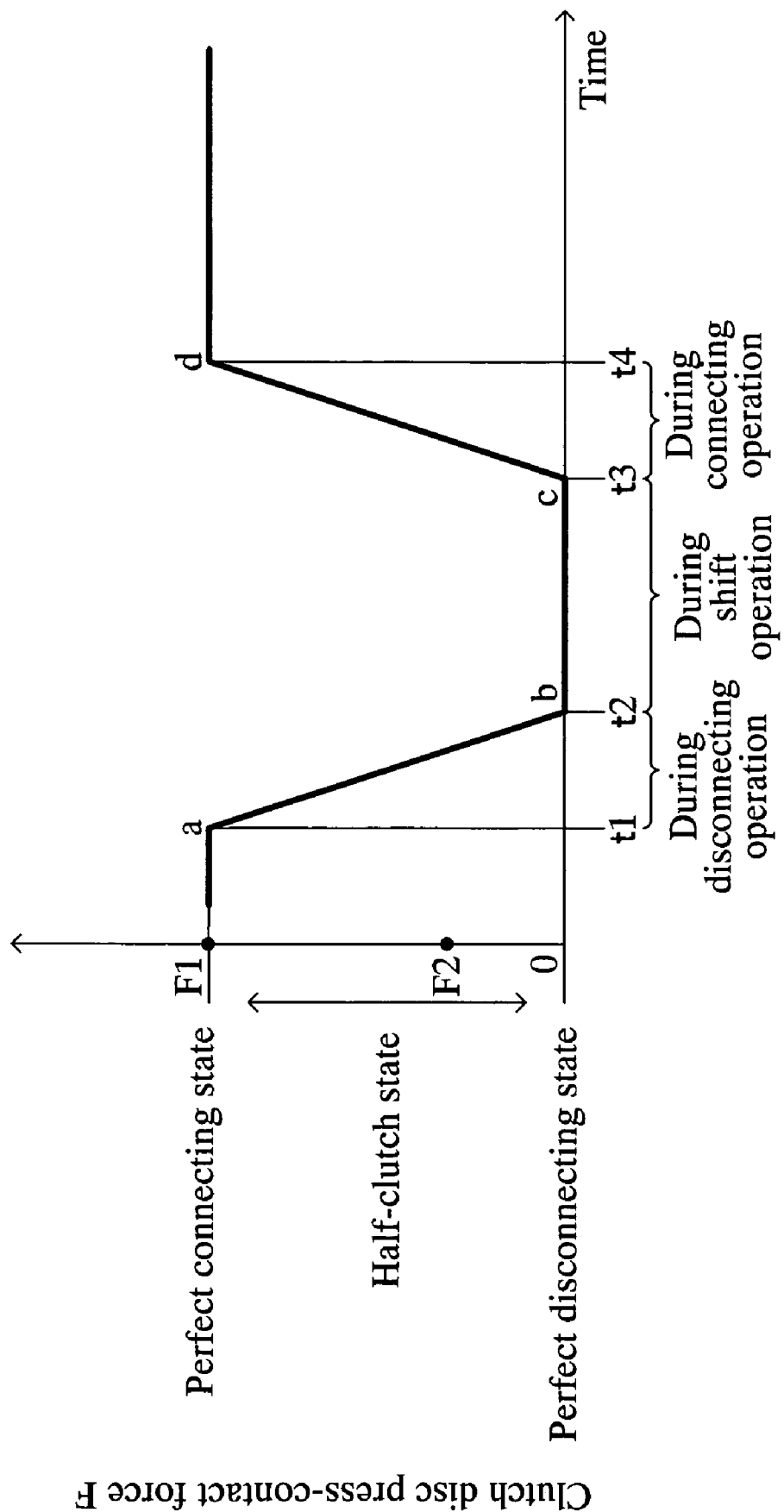
FIG. 4 is a time chart showing a change, with respect to a time, of press-contact force exerted on a friction face of a clutch disc in a clutch shown in FIG. 1 when the clutch is driven so as to be connected or disconnected due to a gear-shift operation.

Explained hereinbelow with reference to FIG. 4 is a basic clutch connecting/disconnecting control and gear-shift control executed by this device. FIG. 4 is a time chart showing a change of the press-contact force F, exerted on the frictional face of the clutch disc in the clutch 24, to a time when the UP signal or DOWN signal is outputted from the shift position sensor 45 for driving the clutch 24 so as to be connected or disconnected. It is supposed in this time chart that the UP signal or DOWN signal is outputted from the shift position sensor 45 at a time t1.

Firstly, since the clutch 24 is in the perfect connecting state until the time t1, the press-contact force F is maintained to the maximum value F1 explained before. In other words, the driving force of the clutch connecting/disconnecting actuator 24a is "0". When the time has elapsed to become the time t1 from this state, this device starts to increase the driving force of the clutch connecting/disconnecting actuator 24a at a predetermined constant speed (constant increasing rate).

This allows the press-contact force F to decrease from the maximum value F1 (corresponding to a point a in FIG. 4) at a predetermined constant speed, whereby the disconnecting operation is started and executed for changing the state of the clutch 24 from the perfect connecting state to the perfect disconnecting state, and the clutch 24 is brought into a half-clutch state.

When the time has elapsed to become a time t2 the press-contact force F becomes "0" (corresponding to a point b in FIG. 4), so that the aforesaid disconnecting operation is completed and the clutch 24 is in the perfect disconnecting state. At this time, the clutch connecting/disconnecting actuator 24a outputs the signal indicating that the clutch 24 is in the perfect disconnecting state. The period from the time t1 to the time t2 is referred here to "during disconnecting operation".

On the other hand, this device executes "throttle valve opening control during disconnecting operation" during the aforesaid disconnecting operation, in order to prevent the occurrence of a racing of the engine 21 attributed to the fact that the load of the engine 21 is decreased with the decrease in the ratio of power, among the power of the engine 21, that can be transmitted to the transmission 25 by the clutch 24 as the disconnecting operation is proceeded.

Specifically, this device sets, during over the disconnecting operation, a predetermined allowable opening of the throttle valve that is decreased as the driving force of the clutch connecting/disconnecting actuator 24a increases. When the opening of the throttle valve TH corresponding to the operating amount Accp of the accelerator pedal AP by the driver exceeds the allowable opening, this device controls the throttle valve actuator 22 such that the opening of the throttle valve TH becomes the allowable opening.

Further, this device starts the gear-shift operation at the time t2 with the clutch 24 maintained in the perfect disconnecting state. Specifically, with the driving force of the clutch connecting/disconnecting actuator 24a maintained to the value at the time t2 (the press-contact force F is maintained to "0".), in case where the UP signal is outputted from the shift position sensor 45 at the time t1, this device starts to drive the gear-shift actuator 25a such that the forward gear stage of the transmission 25 is changed from the forward gear stage at present to the next forward gear stage (target stage) toward the high-speed side, while in case where the DOWN signal is outputted from the shift position sensor 45 at the time t1, this device starts to drive the gear-shift actuator 25a such that the forward gear stage of the transmission 25 is changed from the forward gear stage at present to the next forward gear stage (target stage) toward the low-speed side.

When the time has elapsed to become a time t3, this device completes to change the forward gear stage of the transmission 25 to the target gear stage (corresponding to a point c in FIG. 4). At this time, the gear-shift actuator 25a outputs the signal indicating that the gear-shift operation is completed, whereby the gear-shift operation (gear-shift control) is completed. The period during the time t2 to the time t3 is referred here to as "during shift operation".

On the other hand, this device executes "throttle valve opening control during shift operation" during the aforesaid shift operation, in order to prevent the occurrence of a racing of the engine 21 attributed to the fact that the clutch 24 is in the perfect disconnecting state and the engine 21 is in the unloaded condition. Specifically, during over the shift operation, this device controls the throttle valve actuator 22 such that, regardless of the operating amount Accp of the accelerator pedal AP by the driver, the opening of the throttle valve TH becomes the opening (constant value) of the throttle valve TH corresponding to the value at the time when the operating amount Accp of the accelerator pedal AP by the driver is "0".

Further, the time has elapsed to become the time t3, this device starts to decrease the driving force of the clutch connecting/disconnecting actuator 24a at a predetermined constant speed (constant decreasing rate). This allows the press-contact force F to increase from "0" (corresponding to the point c in FIG. 4) at a predetermined constant speed after the time t3, whereby the connecting operation is started and executed for changing the state of the clutch 24 from the perfect disconnecting state to the perfect connecting state, and the clutch 24 is brought into the half-clutch state.

When the time has elapsed to become a time t4, the press-contact force F becomes the maximum value F1 (corresponding to a point d in FIG. 4) because the driving force of the clutch connecting/disconnecting actuator 24a becomes "0", so that the aforesaid connecting operation is completed and the clutch 24 is in the perfect connecting state. At this time, the clutch connecting/disconnecting actuator 24a outputs the signal indicating that the clutch 24 is in the perfect connecting state. Consequently, the clutch connecting/disconnecting operation is completed. The period from the time t3 to the time t4 is referred here to as "during connecting operation".

On the other hand, this device executes "throttle valve opening control during connecting operation" during the aforesaid connecting operation, in order to transmit the power of the engine 21 to the maximum while preventing the occurrence of a racing of the engine 21, with the fact that the ratio of power, among the power of the engine 21, that can be transmitted to the transmission 25 by the clutch 24 increases as the connecting operation is proceeded.

Specifically, this device sets, during over the connecting operation, a predetermined allowable opening of the throttle valve that is increased as the driving force of the clutch connecting/disconnecting actuator 24a decreases. When the opening of the throttle valve TH corresponding to the operating amount Accp of the accelerator pedal AP by the driver exceeds the allowable opening, this device controls the throttle valve actuator 22 such that the opening of the throttle valve TH becomes the allowable opening.

As described above, this device executes the above-mentioned clutch connecting/disconnecting control and gear-shift control upon the gear-shift. Additionally, as described later, driving force of the clutch connecting/disconnecting actuator 24a is controlled according to various running states of a vehicle regardless of the gear-shift operation, whereby this device controls the clutch 24 to be brought into the half-clutch state or the perfect disconnecting state (hereinafter referred to as "half-clutch control"). Means for controlling the state of the clutch 24 by controlling the driving force of the clutch connecting/disconnecting actuator 24a in this way corresponds to clutch control means.

Specifically, when the clutch 24 is controlled to be brought into the half-clutch state based upon the half-clutch control, this device controls the driving force of the clutch connecting/disconnecting actuator 24a such that the press-contact force F of the clutch disc becomes the constant value F2 shown in FIG. 4. This constant value F2 is, for example, approximately a third of the maximum value F1. On the other hand, when the clutch 24 is controlled to be brought into the perfect disconnecting state based upon the half-clutch control, this device controls the driving force of the clutch connecting/disconnecting actuator 24a such that the press-contact force F of the clutch disc becomes "0".

[Outline of Half-Clutch Control of the Invention]

The outline of the half-clutch control is explained hereinbelow every case where the half-clutch control is executed.

<Half-Clutch Control According to Deceleration Slip Amount of Driving Wheel>

In order to obtain a deceleration slip amount of the driving wheels RL and RR generated by braking force of the engine brake, this device firstly calculates a wheel speed Vw (km/h) of each wheel obtained by the wheel speed sensor 41 and an estimated vehicle body speed Vso (km/h) of the vehicle based upon the following formula 1. The symbol "" marked at the end of the various variables, flags, symbols or the like is a comprehensive expression of "fl", "fr" or the like marked at the end of the various variables, flags or symbols for showing which wheel such as FR or the like is related to the various variables, flags, symbols or the like in this specification. For example, the wheel speed Vw comprehensively represents the front-left wheel speed Vwfl, front-right wheel speed Vwfr, rear-left wheel speed Vwrl and rear-right wheel speed Vwrr. Further, the symbol "r*" marked at the end of the various variables, flags or symbols or the like is a comprehensive expression of "rl", "rr" or the like marked at the end of the various variables, flags or symbols for showing which one of the driving wheels RL and RR is related to the various variables, flags, symbols or the like. For example, the wheel speed Vwr* comprehensively represents the rear-left wheel speed Vwrl and rear-right wheel speed Vwrr.

$$Vso = f(Vw^{**})  \quad\text{[Formula 1]}$$

In the formula 1, a function f is a function for calculating the estimated vehicle body speed Vso based upon the wheel speed Vw of each wheel, and the estimated vehicle body speed Vso is, for example, calculated so as to become a maximum value of the wheel speeds Vw of each wheel.

Subsequently, this device calculates a first deceleration slip determining reference value Vwref1 based upon the following formula 2 as a reference value for determining whether the half-clutch control is executed or not according to the deceleration slip amount (driving wheel deceleration slip related amount, Vso−Vwr*) of the driving wheels RL and RR, and further, calculates a second deceleration slip determining reference value Vwref2 based upon the following formula 3 as a reference value for determining which state the clutch 24 is brought into, the half-clutch state or the perfect disconnecting state, upon executing the half-clutch control.

$$Vwref1 = \min(Vso \cdot 0.9,\ Vso-5) \quad\text{[Formula 2]}$$

$$Vwref2 = \min(Vso \cdot 0.8,\ Vso-10) \quad\text{[Formula 3]}$$

This device controls the clutch 24 to be brought into the perfect disconnecting state when at least one (the smaller one) of the wheel speeds Vwr* of the driving wheels is not more than the second deceleration slip determining reference value Vwref2. Further, this device controls the clutch 24 to be brought into the half-clutch state when the smaller value of the wheel speeds Vwr* of the driving wheels is greater than the second deceleration slip determining reference value Vwref2 and not more than the first deceleration slip determining reference value Vwref1. Moreover, this device does not execute the half-clutch control when the smaller value of the wheel speeds Vwr* of the driving wheels is greater than the first deceleration slip determining reference value Vwref1.

As described above, this device controls the clutch 24 to be brought into the half-clutch state or to the perfect disconnecting state according to the deceleration slip amount (Vso−Vwr*) of the driving wheels RR and RL generated by braking force of the engine brake, regardless of the gear-shift operation. This enables to avoid the increase of the deceleration slip amount of the driving wheels RL and RR. The means for executing the aforesaid formulae 1 to 3 correspond here to deceleration slip related amount obtaining means.

Figure 5:
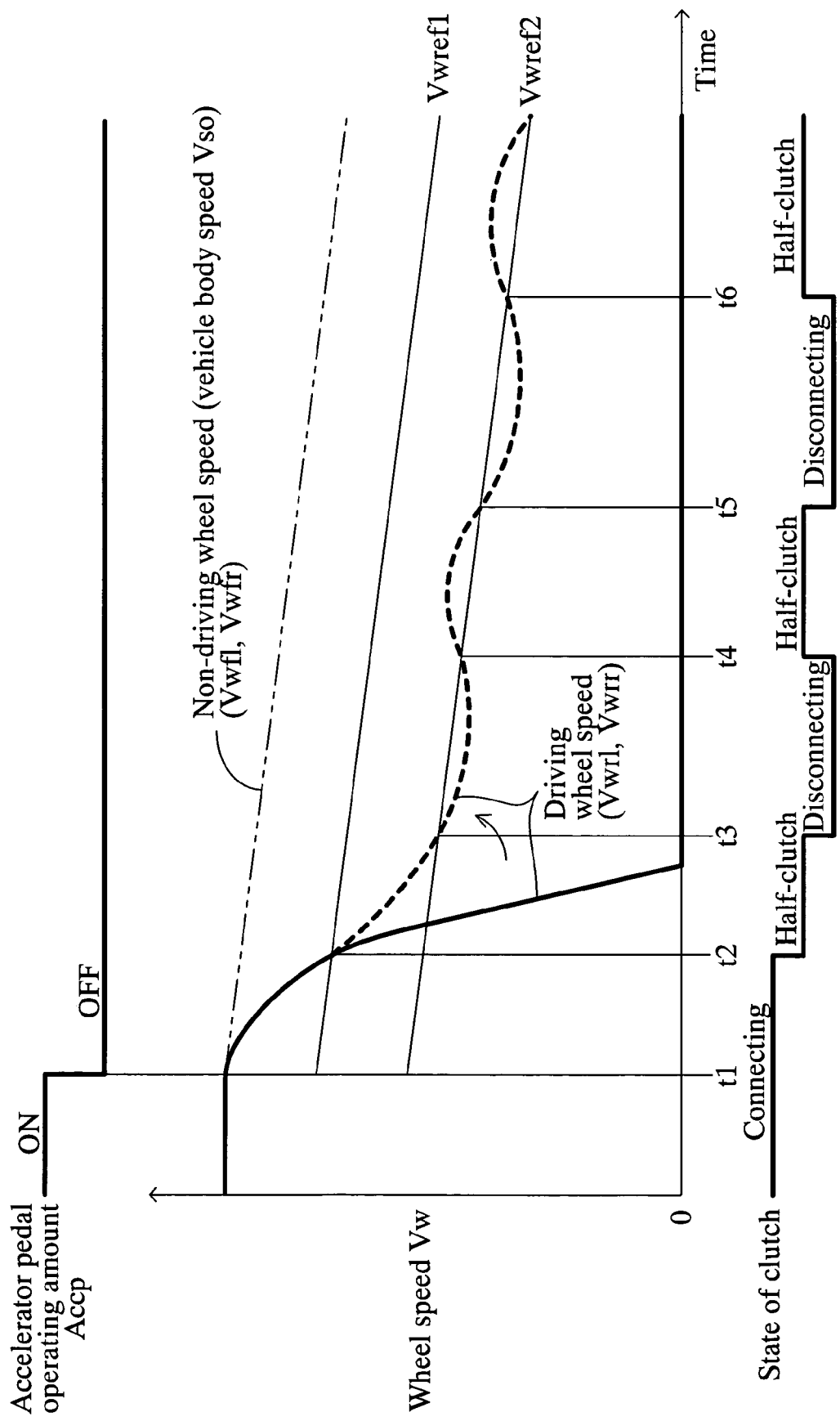
FIG. 5 is a time chart showing a change, with respect to a time, of a wheel speed of each wheel including a driving wheel and a state of the clutch, in order to explain an effect by executing a half-clutch control according to a deceleration slip amount of the driving wheel.

FIG. 5 is a time chart showing a change of each wheel speed Vw and the state of the clutch 24 when the deceleration slip occurs on the driving wheels RL and RR due to the braking force of the engine brake after the time t1 in case where a driver changes the operating amount Accp of the accelerator pedal from a predetermined constant value (ON) to "0" (OFF) at the time t1 and then keeps the same amount to "0" thereafter, during when the vehicle runs on a road having a low road friction coefficient. The driver does not operate the brake pedal BP during the period shown in FIG. 5.

In order to explain an effect of the half-clutch control, the change of the driving wheel speed Vwr* in case where the half-clutch control is not executed and the clutch 24 is kept to be in the perfect connecting state during the period shown in FIG. 5 is shown by a solid line in FIG. 5, while the change of the driving wheel speed Vwr* in case where the half-clutch control is executed by this device is shown by a broken line in the same figure. Further, the change of the non-driving wheel speeds Vwfl, Vwfr (i.e., the estimated vehicle body speed Vso) is shown by a two-dot-chain line. Additionally, the change of the state of the clutch 24 shown in FIG. 5 is the one when the half-clutch control is executed.

Firstly explained is the change of the driving wheel speed Vwr* in case where the half-clutch control is not executed. As shown by the solid line in FIG. 5, the braking force of the engine brake is exerted on the driving wheels RL and RR, so that the deceleration slip occurs on the driving wheels RL and RR, whereby the deceleration slip amount (Vso−Vwr*) starts to increase after the time t1. At a time t2 the driving wheel speed Vwr* reaches the first deceleration slip determining reference value Vwref1, and immediately after the time t2 the driving wheel speed Vwr* is lowered to the second deceleration slip determining reference value Vwref2.

However, since the clutch 24 is kept to be in the perfect connecting state, the braking force of the engine brake exerted on the driving wheels RL and RR does not decrease. As a result, the driving wheel speed Vwr* keeps on decreasing as it is (the deceleration slip amount (Vso−Vwr*) keeps on increasing), and immediately before the time t3, the driving wheels. RL and RR are locked and engine stall occurs, thereby greatly deteriorating a stability of the vehicle.

On the other hand, explanation is made about the change of the driving wheel speed Vwr* in case where the half-clutch control is executed by this device. Since the clutch 24 is kept to be in the perfect connecting state up to the time t2 when the driving wheel speed Vwr* reaches the first deceleration slip determining reference value Vwref1, the driving wheel speed Vwr* changes in the same manner of the case where the half-clutch control is not executed, as shown by the broken line in FIG. 5.

At the time t2 the driving wheel speed Vwr* becomes not more than the first deceleration slip determining reference value Vwref1, so that the state of the clutch 24 is changed to the half-clutch state after the time t2 as shown in FIG. 5. This allows to decrease the braking force exerted on the driving wheels RL and RR due to the engine brake, whereby the decreasing speed of the driving wheel speed Vwr* becomes slower than that of the case where the half-clutch control is not executed. However, the vehicle is running on the road having a low road friction coefficient, so that the friction force from the road surface for increasing the driving wheel speed Vwr* is small, and therefore, the driving wheel speed Vwr* keeps on decreasing after the time t2.

At the time t3, the driving wheel speed Vwr* becomes not more than the second deceleration slip determining reference value Vwref2, so that the state of the clutch 24 is changed to the perfect disconnecting state after the time t3. By this, the braking force due to the engine brake is not exerted on the driving wheels RL and RR after the time t3, whereby the driving wheel speed Vwr* decreases for a while and then starts to increase by the friction force from the road surface.

At a time t4, the driving wheel speed Vwr* returns again to a value greater than the second deceleration slip determining reference value Vwref2 and not more than the first deceleration slip determining reference value Vwref1, so that the state of the clutch 24 is changed again to the half-clutch state after the time t4. By this, the braking force is exerted again on the driving wheels RL and RR due to the engine brake, whereby the driving wheel speed Vwr* increases for a while and then starts to decrease again.

At a time t5, the driving wheel speed Vwr* becomes not more than the second deceleration slip determining reference value Vwref2 like the time t3, so that the state of the clutch 24 is changed again to the perfect disconnecting state after the time t5. At a time t6, the driving wheel speed Vwr* returns to a value greater than the second deceleration slip determining reference value Vwref2 and not more than the first deceleration slip determining reference value Vwref1 like the time t4, so that the state of the clutch 24 is changed again to the half-clutch state after the time t6.

As described above, when the half-clutch control is executed by this device, an excessive increase in the deceleration slip amount of the driving wheels RL and RR can be avoided, whereby the stability of the vehicle can satisfactorily be maintained and the occurrence of the engine stall can be prevented.

<Half-Clutch Control During Vehicle Stabilizing Control>

This device executes a well-known ABS control, front-rear braking force distribution control and brake steering control by utilizing the brake hydraulic control apparatus 30. These controls are vehicle stabilizing controls wherein a target slip ratio St (target wheel speed related amount) of each wheel is set according to the running state of the vehicle and braking force exerted on each wheel is controlled such that the actual slip ratio Sa((Vso−Vw**)/Vso) (actual wheel speed related amount) of each wheel becomes the target slip ratio St, thereby stabilizing the running state of the vehicle. The means for executing the vehicle stabilizing control as described above corresponds to vehicle stabilizing control executing means.

The vehicle stabilizing control is accomplished such that the hydraulic control mode is set to "pressure-up" with respect to the wheel having the actual slip ratio Sa smaller than the target slip ratio St, thereby increasing the brake fluid pressure in the wheel cylinder W of this wheel, and such that the hydraulic control mode is set to "pressure-down" with respect to the wheel having the actual slip ratio Sa greater than the target slip ratio St, thereby decreasing the brake fluid pressure in the wheel cylinder W of this wheel.

Specifically, in case where the actual wheel speed Vwr* of the driving wheel R* is smaller than the wheel speed corresponding to the target slip ratio Str* of the driving wheel R* (in case where the deceleration slip excessively occurs) when the ABS control is executed, for example, the hydraulic control mode is set to "pressure-down" with respect to the driving wheel R*, thereby reducing the brake fluid pressure in the wheel cylinder Wr* of the driving wheel R*. As a result, the wheel speed Vwr* of the driving wheel R* is increased due to the friction force from the road surface, whereby the actual wheel speed Vwr* of the driving wheel R* is controlled to be increased and converged to the wheel speed corresponding to the target slip ratio Str*. Then, when the actual wheel speed Vwr* of the driving wheel R* is completed to be converged to the wheel speed corresponding to the target slip ratio Str*, the state where the hydraulic control mode is set to "pressure-down" to the driving wheel R* is completed.

However, when the braking force is exerted on the driving wheel R* due to the engine brake and the clutch 24 is kept to be in the perfect connecting state at this time, such braking force becomes a great disturbance when the vehicle is running, in particular, on the road surface with a small road friction coefficient, i.e., the road surface having small friction force therefrom, whereby there may be a case that the wheel speed Vwr* of the driving wheel R* does not immediately increase. In this case, it takes much time for the actual wheel speed Vwr* of the driving wheel R* to increase and converge to the wheel speed corresponding to the target slip ratio Str*, thereby being difficult to precisely execute the ABS control. In other words, the time for keeping the hydraulic control mode to be set to "pressure-down" to the driving wheel R* becomes long.

In view of this knowledge, this device monitors, every driving wheel R*, a time Tr* when the state of setting the hydraulic control mode to "pressure-down" based upon the vehicle stabilizing control is continued, and when the longer one of the continuation time Tr* of the "pressure-down" mode to each driving wheel R* becomes not less than a predetermined second reference time Tr2, it controls the clutch 24 to be brought into the perfect disconnecting state. Further, when the longer one of the continuation time Tr* of the "pressure-down" mode to each driving wheel R* is less than the second reference time Tr2 and not less than a predetermined first reference time Tr1 that is shorter than the second reference time, this device controls the clutch 24 to be brought into the half-clutch state. Moreover, when the longer one of the continuation time Tr* of the "pressure-down" mode to each driving wheel R* is less than the first reference time Tr1, this device does not execute the half-clutch control.

As described above, when the braking force of the engine brake becomes a great disturbance to the vehicle stabilizing control during the same control, this device controls the clutch 24 to be brought into the half-clutch state or to the perfect disconnecting state according to the continuation time Tr* (convergence rate) of the "pressure-down" mode, regardless of the gear-shift operation. This can assure the precision in the vehicle stabilizing control, and further, can maintain the stability of the vehicle. The means for monitoring the continuation time Tr* corresponds here to convergence rate obtaining means.

<Half-Clutch Control According to Judder Vibration Continuation Time>

When the vehicle is accelerated by power from the engine 21 with the clutch 24 kept in the perfect connecting state, there may be the case where a so-called judder vibration occurs on each component composing a driving system from the engine 21 to the driving wheel R*. In this case, when the clutch 24 is kept to be in the perfect connecting state, the judder vibration continuously occurs on the vehicle for a long time, resulting in giving to an occupant of the vehicle uncomfortable feeling, and further, giving an adverse affect, such as deterioration in durability, to each component composing the driving system.

This device determines the occurrence and termination of the judder vibration as described below for obtaining a continuation time (a degree of a predetermined vibration) of the judder vibration. At first, the determination whether the judder vibration occurs or not will be explained with reference to FIG. 6.

Figure 6:
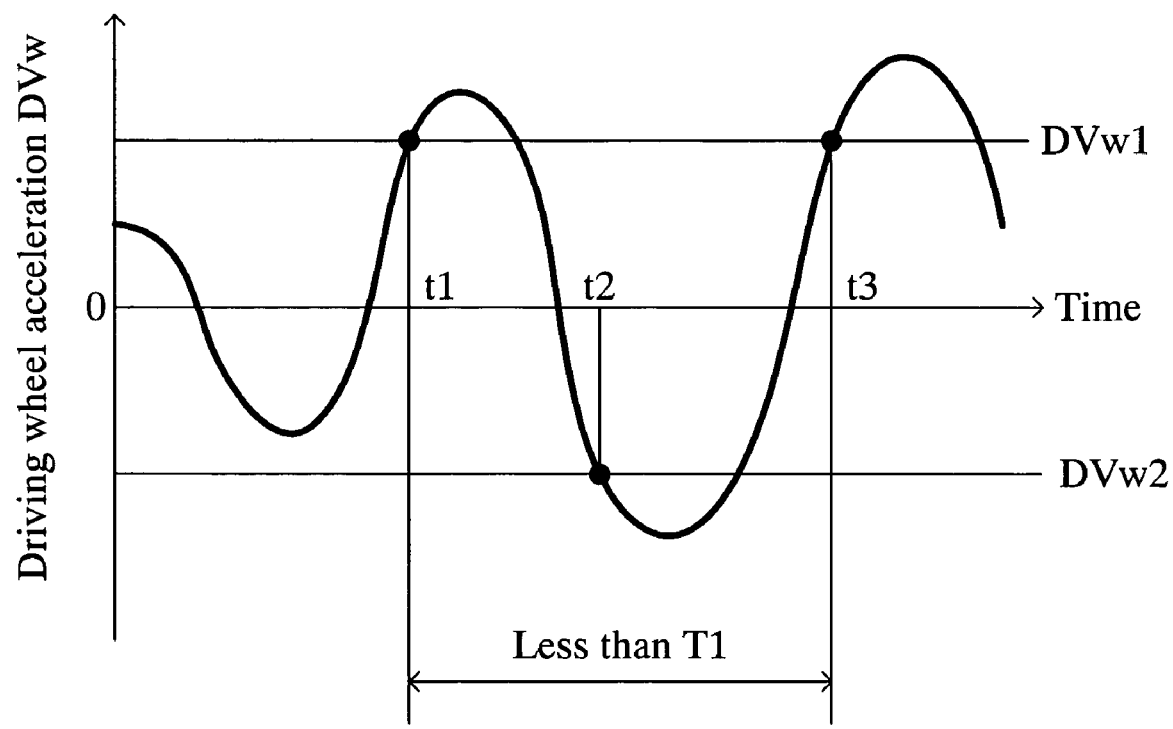
FIG. 6 is a time chart showing a change, with respect to a time, of an acceleration of the driving wheel, in order to explain a condition that the CPU shown in FIG. 1 determines an occurrence of a judder vibration.

FIG. 6 is a time chart showing a change of a driving wheel acceleration DVwr* (a time derivative value of a driving wheel speed Vwr*) in a state where the judder vibration occurs. As shown in FIG. 6, the driving wheel acceleration DVwr* vibrates with a frequency close to a resonance frequency of the entire driving system with an amplitude more than a predetermined amplitude, when the judder vibration occurs.

By utilizing this phenomena, when a period that the driving wheel acceleration DVwr* increases to pass the positive reference value DVw1 (changes from a value smaller than the positive reference value DVw1 to a value greater than the same value) (corresponding to a time t1 in FIG. 6), then, decreases to pass the negative reference value DVw2 (changes from a value smaller than the negative reference value DVw2 to a value greater than the same value) (corresponding to a time t2 in FIG. 6), and thereafter, increases again to pass the positive reference value DVw1 (corresponding to a time t3 in FIG. 6), is less than a predetermined judder vibration occurrence reference time T1, (this condition is referred to as "judder vibration occurrence determining condition" hereinbelow), this device determines that the judder vibration occurs at a point (corresponding to the time t3 in FIG. 6) when the driving wheel acceleration DVwr* increases again to pass the positive reference value DVw1. When determining that the judder vibration occurs, this device determines that the judder vibration continues up to the determination of the end of the judder vibration as described later.

Subsequently explained is a determination whether the judder vibration now occurring is ended or not. When the judder vibration occurrence determining condition is not established again during a period when a predetermined judder vibration end reference time T2 that is longer than the judder vibration occurrence reference time T1 has elapsed after the judder vibration occurrence determining condition has been established (corresponding to the time t3 in FIG. 6), this device determines that the judder vibration is ended at a point when the judder vibration end reference time T2 has elapsed.

In case where the judder vibration occurrence determining condition is established once or more up to when the judder vibration end reference time T2 has elapsed, the judder vibration is finally determined to be ended at the point when the judder vibration end reference time T2 has elapsed, when the judder vibration occurrence determining condition is not established again up to when the judder vibration end reference time T2 has elapsed after the judder vibration occurrence determining condition is established.

This device monitors the continuation time Tjudr* of the judder vibration from the point when the judder vibration is determined to occur. When the longer one of the continuation times Tjudr* of the judder vibration to each driving wheel R* becomes not less than a predetermined second reference time Tjud2, this device controls the clutch 24 to be brought into the perfect disconnecting state. Further, when the longer one of the continuation times Tjudr* of the judder vibration to each driving wheel R* becomes less than the predetermined second reference time Tjud2 and not less than a predetermined first reference time Tjud1 that is shorter than the second reference time, this device controls the clutch 24 to be brought into the half-clutch state. Moreover, when the longer one of the continuation times Tjudr* of the judder vibration to each driving wheel R* becomes less than the first reference time Tjud1, this device does not execute the half-clutch control.

As described above, this device controls, regardless of the gear-shift operation, the clutch 24 to be brought into the half-clutch state or to the perfect disconnecting state according to the continuation time Tjudr* of the judder vibration (degree of the predetermined vibration), when the judder vibration occurs. This allows to avoid that the judder vibration further continues, thereby being capable of assuring comfortableness of the occupant of the vehicle and preventing the deterioration in durability of each component composing the driving system. The means for determining the occurrence, continuation and end of the judder vibration described above corresponds here to driving system vibration determining means.

<Half-Clutch Control Based Upon Whether Vehicle is in Spinning State or Not>

When a vehicle is in a spinning state, a driver strongly operates the brake pedal BP to exert strong braking force on each wheel including the driving wheel R*, whereby there may be a case that the driving wheel R* is locked. When the clutch 24 is kept to be in the connecting state in this case, the engine stall occurs. Further, when the vehicle is in the spinning state, an absolute value of a yaw rate Yr of the vehicle frequently becomes greater than a value obtained in a normal running.

This device determines that the vehicle is in the spinning state when the state where the absolute value of the yaw rate Yr obtained by the yaw rate sensor 43 is not less than a predetermined yaw rate reference value Yr1 continues for a time longer than a predetermined spin determining reference time Tspin1. Further, this device determines that the vehicle is not in the spinning state when the absolute value of the yaw rate Yr is less than the yaw rate reference value Yr1 or when the state where the absolute value of the yaw rate Yr is not less than the predetermined yaw rate reference value Yr1 does not continue for a time longer than the spin determining reference time Tspin1. When this device determines that the vehicle is in the spinning state, it controls the clutch 24 so as to be brought into the perfect disconnecting state. Further, when determining that the vehicle is not in the spinning state, this device does not execute the half-clutch control.

As described above, this device controls, regardless of the gear-shift operation, the clutch 24 so as to be brought into the perfect disconnecting state when the vehicle is in the spinning state. This can prevent the occurrence of the engine stall in the engine 21. The means for determining whether the vehicle is in the spinning state or not corresponds here to spinning state determining means.

<Half-Clutch Control During Traction Control>

When a well-known traction control is executed in case where the acceleration slip is excessively generated on the driving wheel R* so that the actual wheel speed Vwr* of the driving wheel R* becomes excessively greater than the wheel speed corresponding to the target slip ratio Str* of the driving wheel R*, braking force by the brake fluid pressure is normally exerted on the driving wheel R*, resulting in that the wheel speed Vwr* of the driving wheel R* is decreased, and therefore, the actual wheel speed Vwr* of the driving wheel R* is controlled to be decreased to thereby be converged to the wheel speed corresponding to the target slip ratio Str*.

In this case, the driving wheel R* may be locked due to the exerted braking force by the brake fluid pressure when, in particular, the vehicle is running on a road surface with a small road friction coefficient. When the clutch 24 is kept to be in the connecting state in this case, the engine stall occurs in the engine 21.

When an engine revolution speed Ne obtained by the revolution speed sensor 46 is not more than a predetermined engine revolution speed reference value Ne1 during the traction control, this device determines that the engine stall may occur in the engine 21, while when the engine revolution speed Ne is greater than the engine revolution speed reference value Ne1, it determines that there is no possibility of the occurrence of the engine stall. When determining that the engine stall may occur, this device controls the clutch 24 to be brought into the half-clutch state. Further, when determining that there is no possibility of the occurrence of the engine stall, this device does not execute the half-clutch control.

As described above, when there is a possibility that the engine stall occurs during the traction control, this device controls, regardless of the gear-shift operation, the clutch 24 to be brought into the half-clutch state. This can prevent the occurrence of the engine stall in the engine 21.

As described above, this device individually decides a control content (whether the half-clutch control is executed or not, and in case where the half-clutch control is executed, which one of the state of the clutch 24 is controlled, the half-clutch state or perfect disconnecting state) from the following five viewpoints: the deceleration slip amount of the driving wheel R*; the convergence time of the driving wheel speed to the driving wheel R* in the pressure-down mode during the vehicle stabilizing control; the continuation time of the judder vibration; whether the vehicle is in the spinning state or not; and whether there is a possibility that the engine stall occurs during the traction control. When each of the selected control content is different, this device finally decides the control content as described below.

Specifically, at first, this device controls the clutch 24 to be brought into the perfect disconnecting state when, among the control contents decided from the above-mentioned five viewpoints, there is at least one control content of controlling the clutch 24 to be brought into the perfect disconnecting state. On the other hand, when there is no such control content and further, among the control contents decided from the above-mentioned five viewpoints, there is at least one control content of controlling the clutch 24 to be brought into the half-clutch state, this device controls the clutch 24 to be brought into the half-clutch state. If not, i.e., if all of the control contents decided from the above-mentioned five viewpoints have a content of not executing the half-clutch control, this device does not execute the half-clutch control. This allows to improve the stability of the vehicle, improve the precision of the vehicle stabilizing control, improve the comfortableness of the occupant and execute the control content for not causing the engine stall. The disclosure explained above is the outline of the half-clutch control according to the present invention.

[Actual Operation]

Subsequently, the actual operation of the control device 10 for a vehicle including the automatic clutch control device of the present invention and having the above-mentioned construction will be explained hereinbelow with reference to FIGS. 7 to 20 showing routines with flowcharts executed by the CPU 51 of the electrical control apparatus 50.

Figure 7:
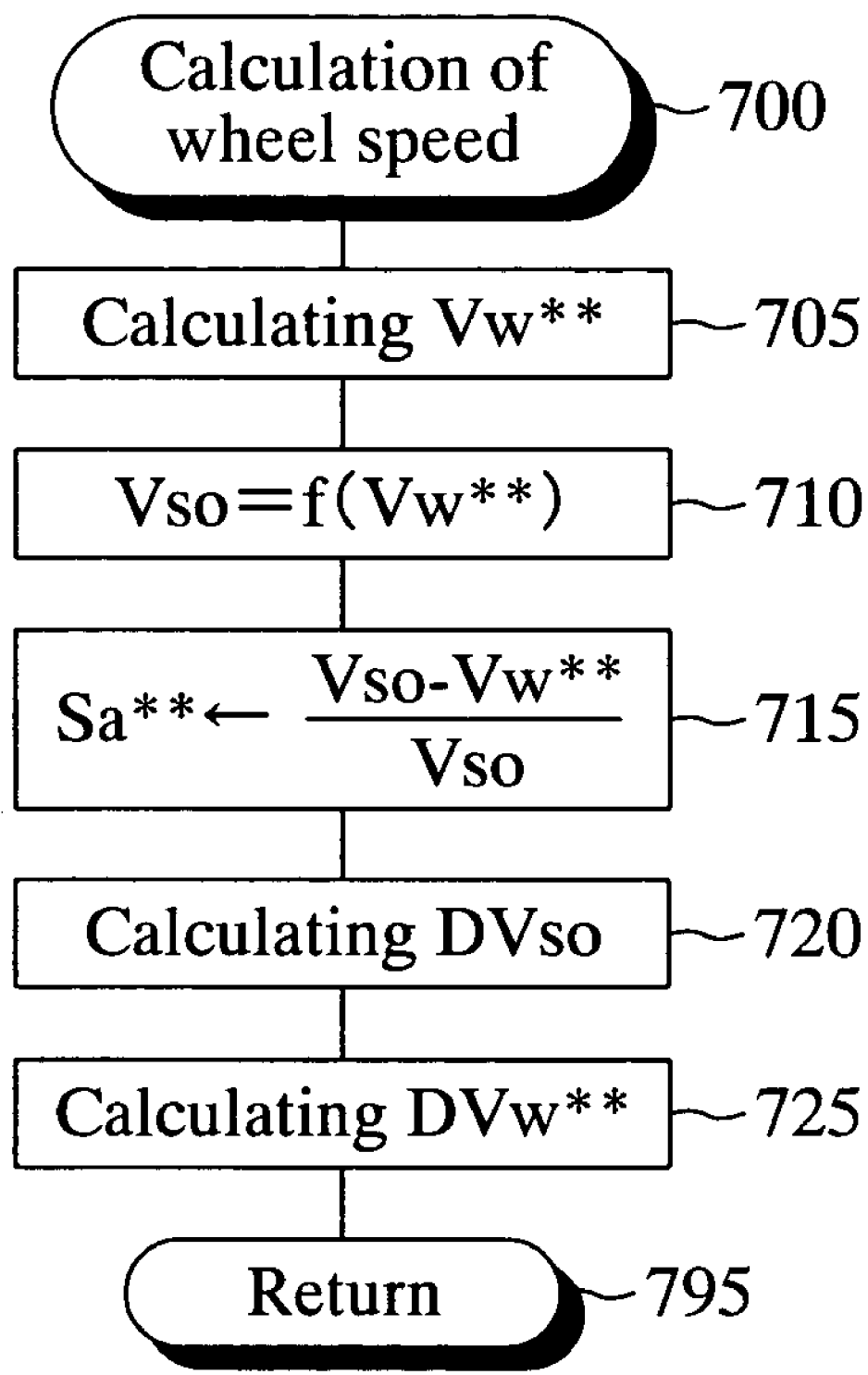

The CPU 51 repeatedly executes a routine shown in FIG. 7 for calculating the wheel speed Vw or the like once every predetermined period. Accordingly, the CPU 51 starts the process from a step 700 at a predetermined timing, and then proceeds to a step 705 to respectively calculate the wheel speed (outer circumferential speed of each wheel) Vw of each wheel FR or the like. Specifically, the CPU 51 respectively calculates the wheel speed Vw of each wheel FR or the like based upon an interval of a pulse possessed by the signal outputted from each wheel speed sensor 41.

Next, the CPU 51 proceeds to a step 710 for calculating the estimated vehicle body speed Vso based upon the above-mentioned formula 1. Then, the CPU 51 proceeds to a step 715 for calculating the actual slip ratio Sa of every wheel based upon the estimated vehicle body speed Vso calculated at the step 710, the wheel speed values Vw of each wheel FR or the like calculated at the step 705 and the formula disclosed in a step 715. This actual slip ratio Sa** is used for calculating braking force that should be exerted on each wheel based upon the vehicle stabilizing control as described later.

Then, the CPU 51 proceeds to a step 720 for calculating an estimated vehicle body acceleration DVso that is a time derivative value of the estimated vehicle body speed Vso based upon the following formula 4.

$$DVso=(Vso-Vso1)/\Delta t \qquad \text{[Formula 4]}$$

In the formula 4, Vso1 is the previous estimated vehicle body speed calculated at the step 710 at the time of the previous execution of this routine, while $\Delta t$ is the above-mentioned predetermined time that is the operation period of this routine.

Then, the CPU 51 proceeds to a step 725 for calculating a wheel acceleration DVw* that is a time derivative value of the wheel speed Vsw** based upon the following formula 5.

$$DVw=(Vw-Vw**1)/\Delta t \qquad \text{[Formula 5]}$$

In the formula 5, Vw**1 is the previous wheel speed calculated at the step 705 at the time of the previous execution of this routine, while $\Delta t$ is the above-mentioned predetermined time that is the operation period of this routine.

Subsequently, a setting of the vehicle stabilizing control mode will be explained. The CPU 51 repeatedly executes a routine shown in FIG. 8 once every predetermined period. Accordingly, the CPU 51 starts the process from a step 800 at a predetermined timing for determining whether or not the value of a clutch/gear-shift control now-executing flag XSHIFT is "0". The clutch/gear-shift control now-executing flag XSHIFT here represents that the above-mentioned clutch/gear-shift control (clutch connecting/disconnecting control) is executed when the value thereof is "1", while represents that the clutch/gear-shift control is not executed when the value thereof is "0".

When the value of the clutch/gear-shift control now-executing flag XSHIFT is "1" in the judgement at the step 805, the CPU 51 immediately moves to a step 895 to temporarily terminate this routine. By this process, the vehicle stabilizing control mode already selected at a step, described later, of this routine at the time (disconnecting operation starting point) when the clutch/gear-shift control is started is maintained as it is during over the clutch/gear-shift control (the period from the disconnecting operation starting point to the connecting operation completing point).

The explanation is continued here assuming that the clutch/gear-shift control is not executed. The CPU 51 makes "Yes" determination at the step 805 and moves to a step 810 for determining whether the ABS control is required or not at present. The ABS control is a control for decreasing the braking force of the specified wheel in case where the specified wheel is locked with the brake pedal BP operated. The detail of the ABS control is well-known, so that the detailed explanation thereof is omitted here.

Specifically, the CPU 51 determines at the step 810 that the ABS control is needed, in case where the brake switch 44 shows that the brake pedal BP is operated and the case where the actual slip ratio Sa** of the specified wheel calculated at the step 715 of FIG. 7 is not less than the predetermined positive value.

When the ABS control is needed in the judgement at the step 810, the CPU 51 proceeds to a step 815 where "1" is set to a variable Mode for setting a control mode executed by performing both the brake steering control described later and the ABS control. Then, the CPU 51 proceeds to a next step 855.

On the other hand, when the ABS control is not needed in the judgement at the step 810, the CPU 51 proceeds to a step 820 for determining whether the front-rear braking force distribution control is needed or not at present. The front-rear braking force distribution control is a control for decreasing a ratio (distribution) of the braking force of rear wheels to the braking force of front wheels in accordance with a magnitude of a deceleration in the front-rear direction of the vehicle with the brake pedal BP operated. The detail of the front-rear braking force distribution control is well-known, so that the detailed explanation thereof is omitted here.

Specifically, the CPU 51 judges at the step 820 that the front-rear braking force distribution control is needed, in case where the brake switch 44 shows that the brake pedal BP is operated and the case where the estimated vehicle body speed DVso calculated at the step 720 of FIG. 7 is a negative value and its absolute value is not less than the predetermined value.

When the front-rear braking force distribution control is needed in the judgement at the step 820, the CPU 51 proceeds to a step 825 where "2" is set to a variable Mode for setting a control mode executed by performing both the brake steering control and the front-rear braking force distribution control. Then, the CPU 51 proceeds to the next step 855.

When the front-rear braking force distribution control is not needed in the judgement at the step 820, the CPU 51 proceeds to a step 830 for determining whether the traction control is needed or not at present. The traction control is a control for increasing the braking force of the specified wheel or decreasing the driving force of the engine 21 in case where the specified wheel is spun in the direction where the driving force of the engine 21 is generated with the brake pedal BP operated. The detail of the traction control is well-known, so that the detailed explanation thereof is omitted here.

Specifically, the CPU 51 judges at the step 830 that the traction control is needed, in case where the brake switch 44 shows that the brake pedal BP is operated and the case where the actual slip ratio Sa of the specified wheel calculated at the step 715 of FIG. 7** is a negative value and its absolute value is not less than the predetermined value.

When the traction control is needed in the judgement at the step 830, the CPU 51 proceeds to a step 835 where "3" is set to a variable Mode for setting a control mode executed by performing both the brake steering control and the traction control. Then, the CPU 51 proceeds to the next step 855.

When the traction control is not needed in the judgement at the step 830, the CPU 51 proceeds to a step 840 for determining whether the brake steering control is needed or not at present. The brake steering control is a control wherein, in case where the vehicle is in an understeer state or in an oversteer state, a predetermined yawing moment is produced on the vehicle by producing braking force on a predetermined wheel, thereby approaching the state of the vehicle to a neutral steer state. The detail of the brake steering control is well-known, so that the detailed explanation thereof is omitted here.

When the brake steering control is needed in the judgement at the step 840, the CPU 51 proceeds to a step 845 where "4" is set to a variable Mode for setting a control mode executed by performing both the brake steering control and the traction control. Then, the CPU 51 proceeds to the next step 855. On the other hand, when it is determined that the brake steering control is not needed in the judgement of the step 845, the CPU 51 proceeds to a step 850 where "5" is set to a variable Mode for setting a non-control mode wherein the vehicle stabilizing control is not executed, and then, proceeds to the next step 855. In this case, the specified wheel that should be controlled is not present.

When the CPU 51 proceeds to the step 855, it sets "1" to a flag CONT corresponding to a wheel to be controlled, while sets "0" to a flag CONT corresponding to a wheel not to be controlled, that is not the wheel to be controlled. The wheel to be controlled at this step 855 is a wheel that is required to control at least one of the corresponding pressure increasing valve PU and the pressure reducing valve PD shown in FIG. 2.

Accordingly, in case where the brake pedal BP is not operated and only the brake fluid pressure in the wheel cylinder Wfr of the front-right wheel is required to be increased, for example, the control valve SA1, change-over valve STR and pressure increasing valve PUfl shown in FIG. 2 are switched over to the second position and the pressure increasing valve PUfl and the pressure reducing valve PDfr are respectively controlled, whereby only the brake fluid pressure in the wheel cylinder Wfr is increased by utilizing the high pressure generated from the high-pressure generating section 31 while keeping the brake fluid pressure in the wheel cylinder Wfl to be the fluid pressure at this time. Therefore, not only the front-right wheel FR but also the front-left wheel FL are included in the wheels to be controlled in this case. After executing the step 855, the CPU 51 proceeds to the step 895 for temporarily terminating this routine. As described above, the vehicle stabilizing control mode is specified and the wheel to be controlled is specified.

Subsequently explained is the control of the braking force that should be exerted on each driving wheel. The CPU 51 repeatedly executes the routine shown in FIG. 9 once every predetermined period. Accordingly, the CPU 51 starts the process from a step 900 at a predetermined timing, and then, proceeds to a step 905 to determine whether the variable Mode is "0" or not. If the variable Mode is "0", it makes "No" determination at the step 905 to proceed to a step 910 where all the solenoid-operated valves in the brake hydraulic control apparatus 30 are turned off (non-actuated state) since the braking control is not required to be executed to each wheel, and thereafter, moves to a step 995 to temporarily complete this routine. By this process, brake hydraulic pressure according to the control force of the brake pedal BP by the driver is supplied to each wheel cylinder W**.

Figure 8:
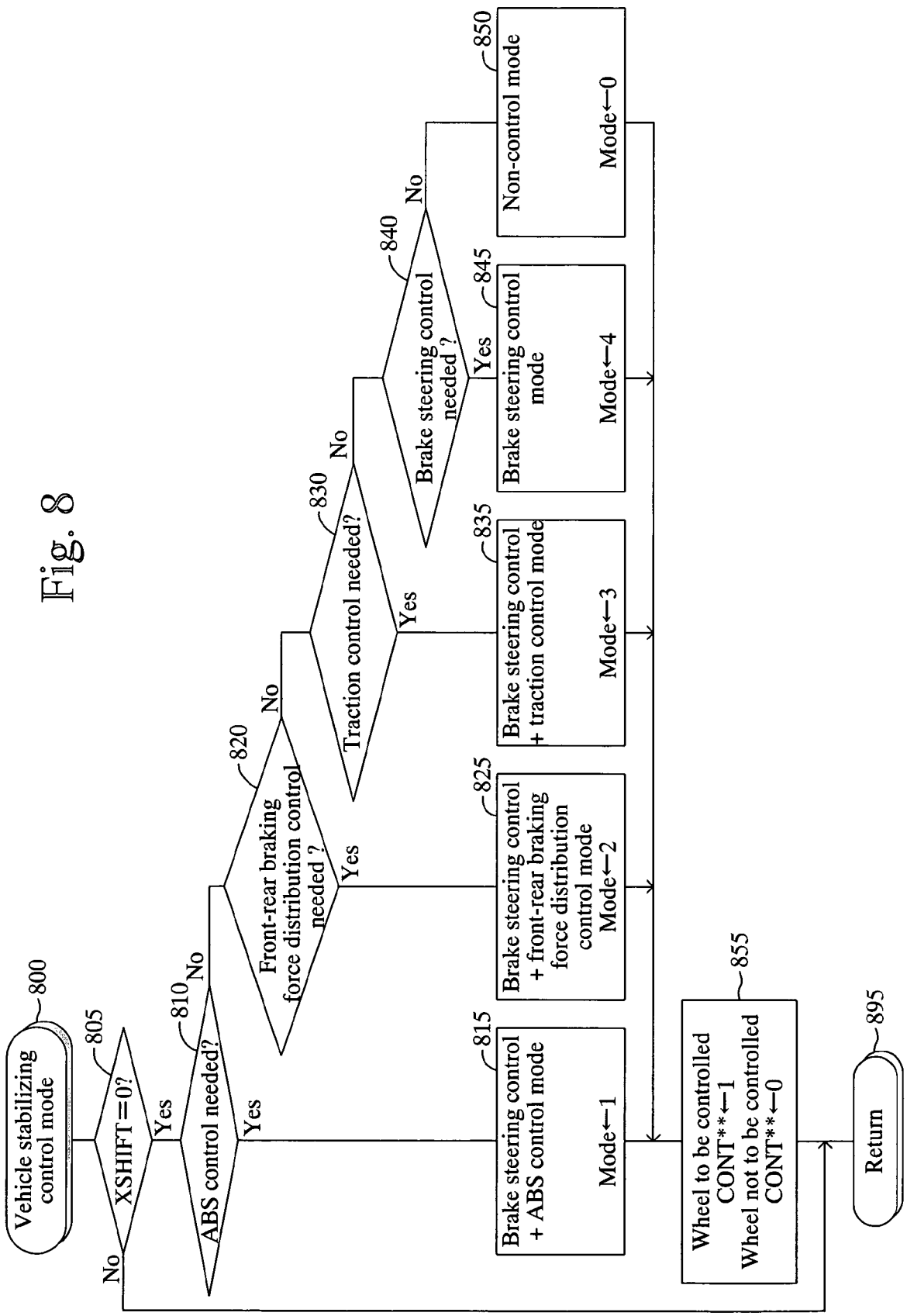
FIG. 8 is a flowchart showing a routine, executed by the CPU shown in FIG. 1, for setting a vehicle stabilizing control mode.
Figure 9:
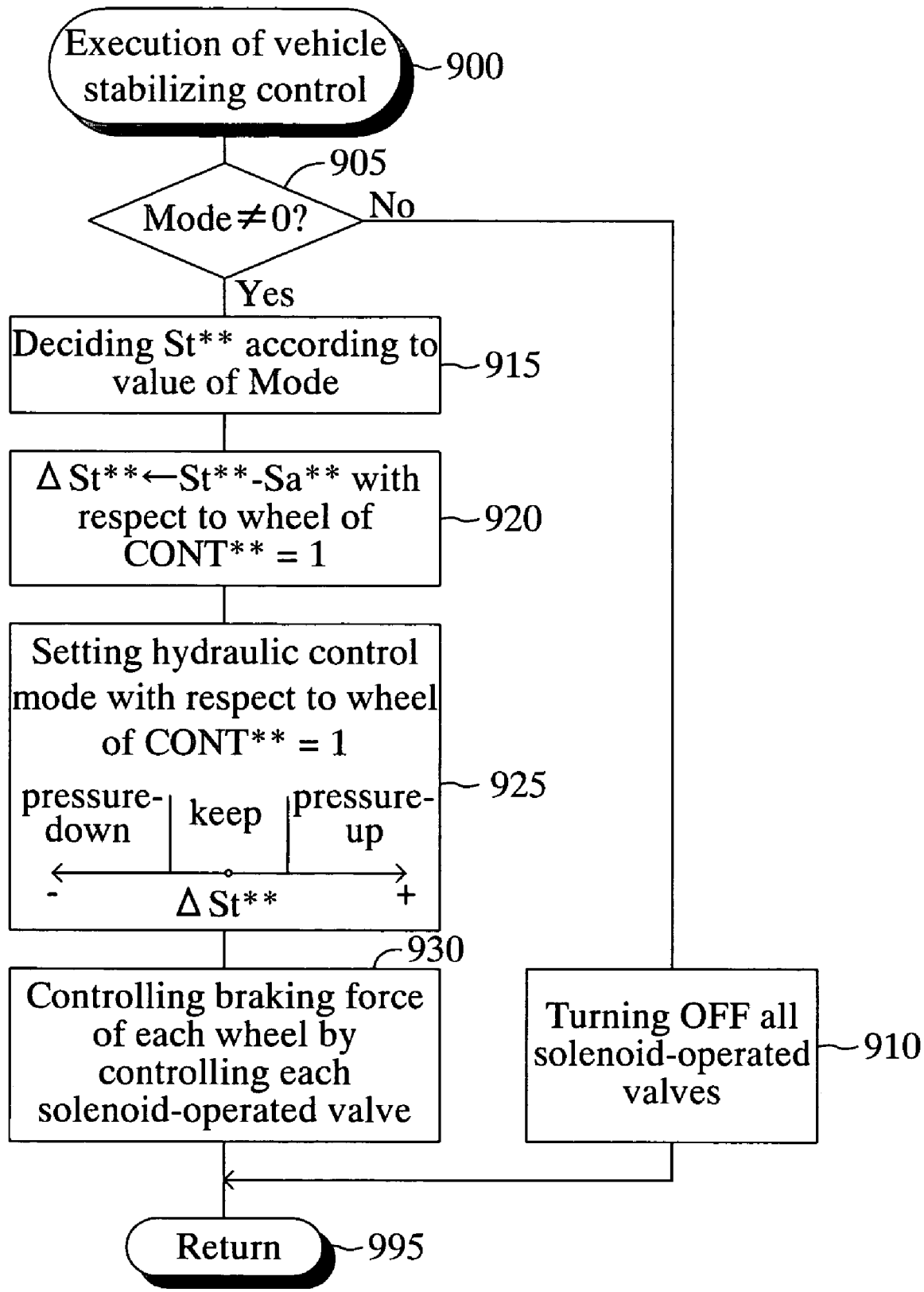
FIG. 9 is a flowchart showing a routine, executed by the CPU shown in FIG. 1, for controlling braking force exerted on each wheel based upon the vehicle stabilizing control.

On the other hand, if the variable Mode is not "0" in the judgement at the step 905, the CPU 51 makes "Yes" determination at the step 905, and proceeds to a step 915 for setting, every wheel to be controlled, the target slip ratio St of each wheel that should be set for executing the vehicle stabilizing control corresponding to the value of the variable Mode set at present by the execution of the routine of FIG. 8**.

Subsequently, the CPU 51 proceeds to a step 920 for setting, to the wheel to be controlled having the value of the flag CONT of "1" set at the step 855 in FIG. 8, a slip ratio deviation $\Delta$ St every wheel to be controlled based upon the value of the target slip ratio St, the value of the actual slip ratio Sa calculated at the step 715 in FIG. 7 and the formula disclosed in the step 920.

Then, the CPU 51 proceeds to a step 925 for setting a hydraulic control mode with respect to the wheel to be controlled every wheel to be controlled. Specifically, every wheel to be controlled, the CPU 51 sets the hydraulic control mode to "pressure-up" when the value of the slip ratio deviation Δ St exceeds the predetermined positive reference value, sets the hydraulic control mode to "keep" when the value of the slip ratio deviation Δ St is not less than the predetermined negative reference value but not more than the predetermined positive reference value, and sets the hydraulic control mode to "pressure-down" when the value of the slip ratio deviation Δ St is less than the predetermined negative reference value, based upon the value of the slip ratio deviation Δ St calculated at the step 920 every wheel to be controlled and the table disclosed in the step 925.

Subsequently, the CPU 51 proceeds to a step 930 where it controls the control valves SA1 and SA2 and the change-over valve STR shown in FIG. 2 based upon the hydraulic control mode set at the step 925 every wheel to be controlled and further it controls the pressure increasing valve PU and pressure reducing valve PD according to the hydraulic control mode every wheel to be controlled.

Specifically, the CPU 51 controls to set the corresponding pressure increasing valve PU and pressure reducing valve PD to the first position (position in the non-actuated state) with respect to the wheel to be controlled having the hydraulic control mode of "pressure-up", while it controls to set the corresponding pressure increasing valve PU to the second position (position in the actuated state) and the corresponding pressure reducing valve PD to the first position with respect to the wheel to be controlled having the hydraulic control mode of "keep", and further it controls to set the corresponding pressure increasing valve PU and pressure reducing valve PD to the second position (position in the actuated state) with respect to the wheel to be controlled having the hydraulic control mode of "pressure-down".

This operation causes to increase the brake fluid pressure in the wheel cylinder W of the wheel to be controlled having the hydraulic control mode of "pressure-up", while to decrease the brake fluid pressure in the wheel cylinder W of the wheel to be controlled having the hydraulic control mode of "pressure-down", whereby each wheel to be controlled is controlled such that the actual slip ratio Sa of each wheel to be controlled approaches to the target slip ratio St. Consequently, the control corresponding to the vehicle stabilizing control mode set in FIG. 8 can be achieved.

It is to be noted that, when the control mode set by the execution of the routine of FIG. 8 is the control mode (variable Mode=3) for executing the traction control mode or the control mode (variable Mode=4) for executing only the brake steering control mode, the CPU 51 controls, according to need, the throttle valve actuator 22 such that the opening of the throttle valve TH becomes smaller by a predetermined amount than the opening thereof according to the operating amount of the accelerator pedal AP, in order to reduce the driving force of the engine 21. Then, the CPU 51 proceeds to the step 995 for temporarily terminating this routine.

Subsequently explained is the determination of starting the clutch/gear-shift control. The CPU 51 repeatedly executes the routine shown in FIG. 10 once every predetermined period. Accordingly, the CPU 51 starts the process from a step 1000 at a predetermined timing, and then, proceeds to a step 1005 to determine whether the UP signal or DOWN signal is outputted from the shift position sensor 45 or not. If the UP signal or DOWN signal is not outputted from the shift position sensor 45, the CPU 51 immediately proceeds to a step 1095 to temporarily complete this routine.

The explanation is continued here assuming that the UP signal or DOWN signal is outputted from the shift position sensor 45 and the clutch/gear-shift control is not executed. The CPU 51 makes "Yes" determination at the step 1005, and proceeds to a step 1010 for determining whether the value of the clutch/gear-shift control now-executing flag XSHIFT is "0" or not.

At present, the clutch/gear-shift control is not executed as described above, so that the value of the clutch/gear-shift control now-executing flag XSHIFT is "0". Accordingly, the CPU 51 makes "Yes" determination at the step 1010 and proceeds to a step 1015 for determining that a value of a half-clutch control now-executing flag XHALF is "0" or not. The half-clutch control now-executing flag XHALF here represents that the above-mentioned half-clutch control is executed when the value thereof is "1", while represents that the half-clutch control is not executed when the value thereof is "0".

At present, the half-clutch control is not executed as described above, so that the value of the half-clutch control now-executing flag XHALF is "0". Accordingly, the CPU 51 makes "Yes" determination at the step 1015 and proceeds to a step 1020 to set the value of the clutch/gear-shift control now-executing flag XSHIFT to "1". Then, the CPU 51 proceeds to the step 1095 to temporarily terminate this routine.

Since the value of the clutch/gear-shift control now-executing flag XSHIFT is "1" after that, the CPU 51 makes "No" determination at the step 1010 to immediately complete this routine, even if the UP signal or DOWN signal is outputted from the shift position sensor 45. Further, even if the value of the clutch/gear-shift control now-executing flag XSHIFT is "0" and the UP signal or DOWN signal is outputted from the shift position sensor 45, the CPU 51 makes "No" determination at the step 1015 if the half-clutch control is now being executed, so that it does not set the value of the clutch/gear-shift control now-executing flag XSHIFT to "1", thereby not starting the clutch/gear-shift control. As described above, the start of the clutch/gear-shift control is determined.

Subsequently explained is the execution of the clutch/gear-shift control. The CPU 51 repeatedly executes the routine shown in FIG. 11 once every predetermined period. Accordingly, the CPU 51 starts the process from a step 1100 at a predetermined timing, and then, proceeds to a step 1102 to monitor whether the value of the clutch/gear-shift control now-executing flag XSHIFT is changed from "0" to "1".

Figure 10:
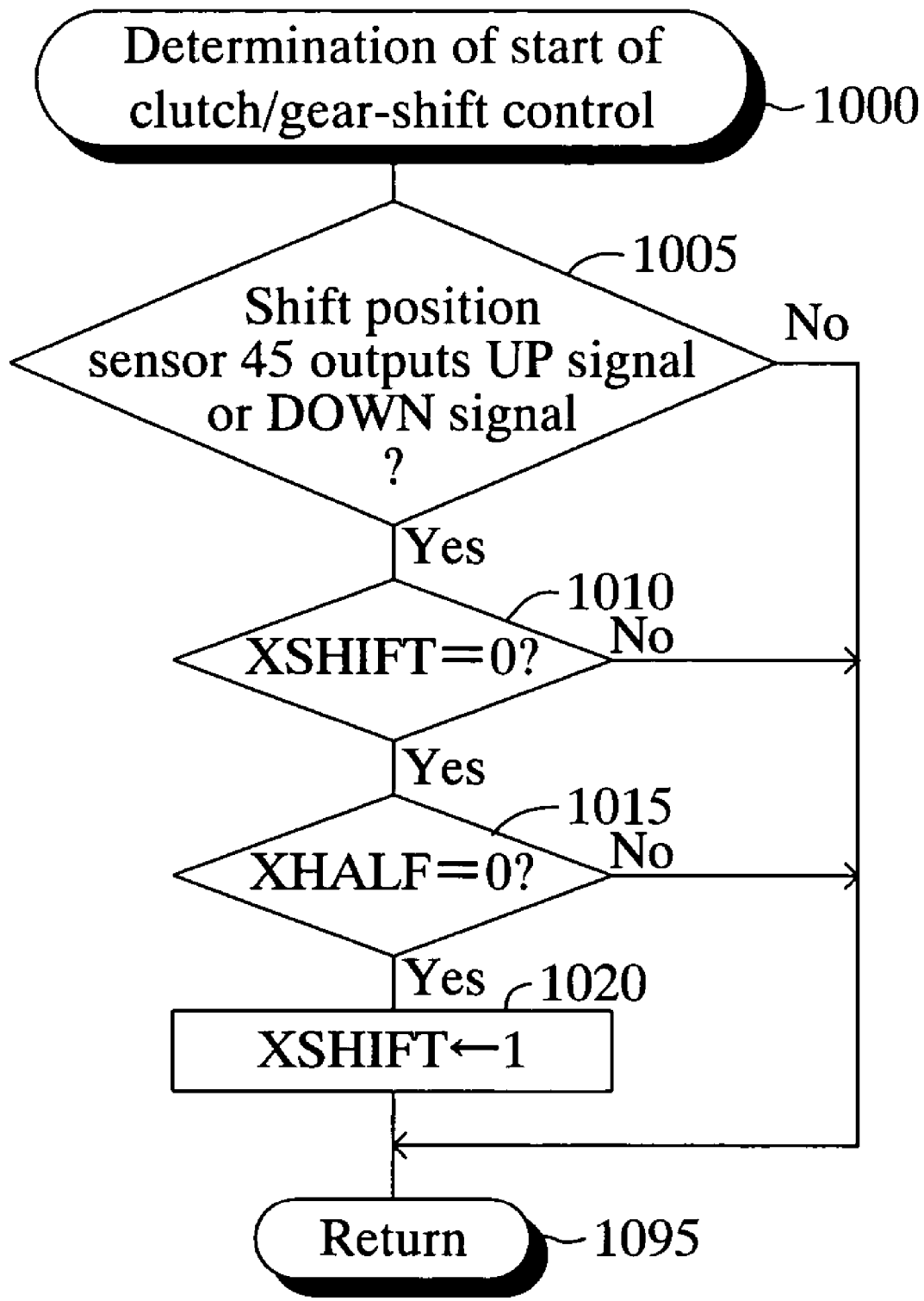
FIG. 10 is a flowchart showing a routine, executed by the CPU shown in FIG. 1, for determining a start of a clutch/gear-shift control.
Figure 11:
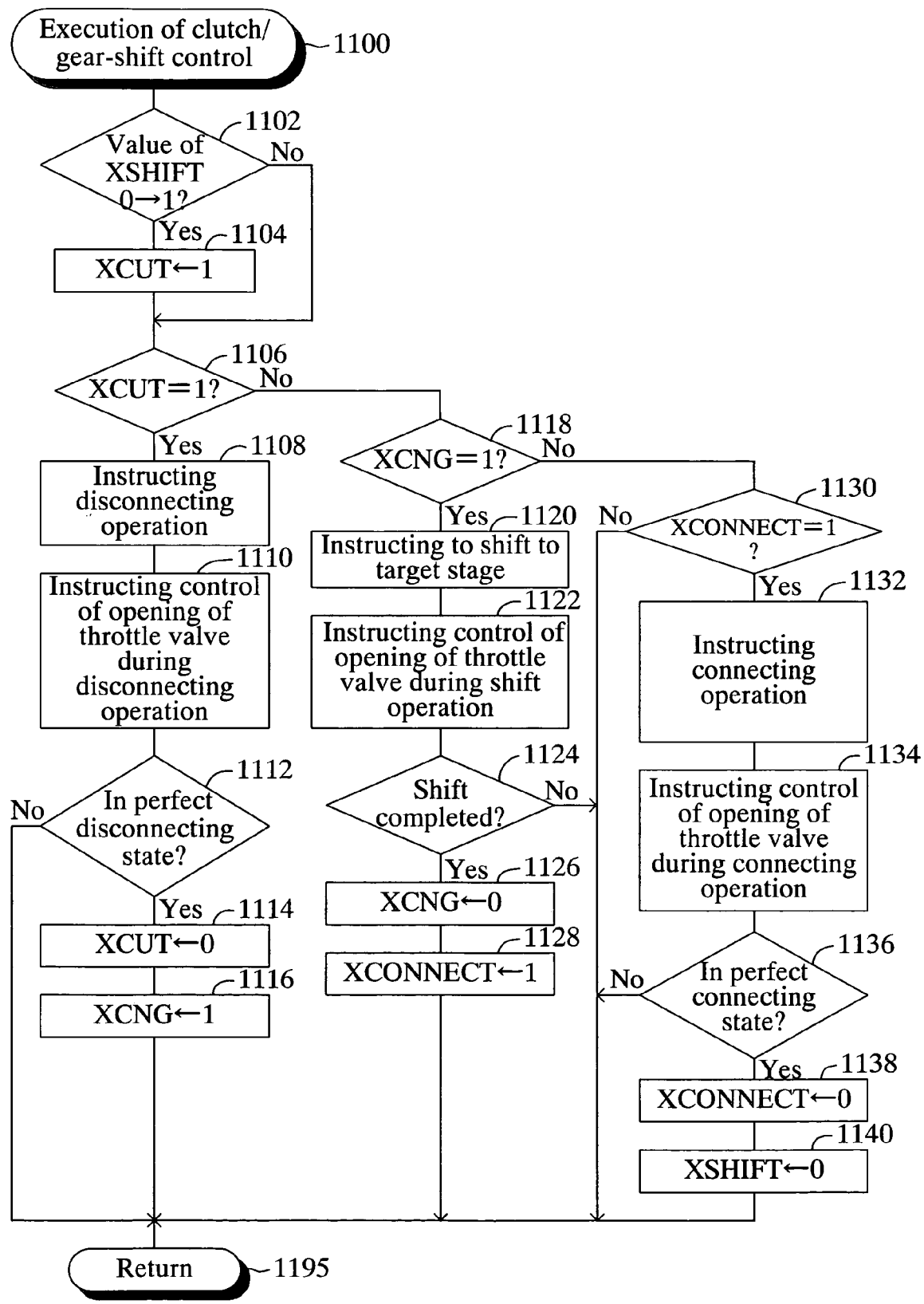
FIG. 11 is a flowchart showing a routine, executed by the CPU shown in FIG. 1, for executing the clutch/gear-shift control.
Figure 12:
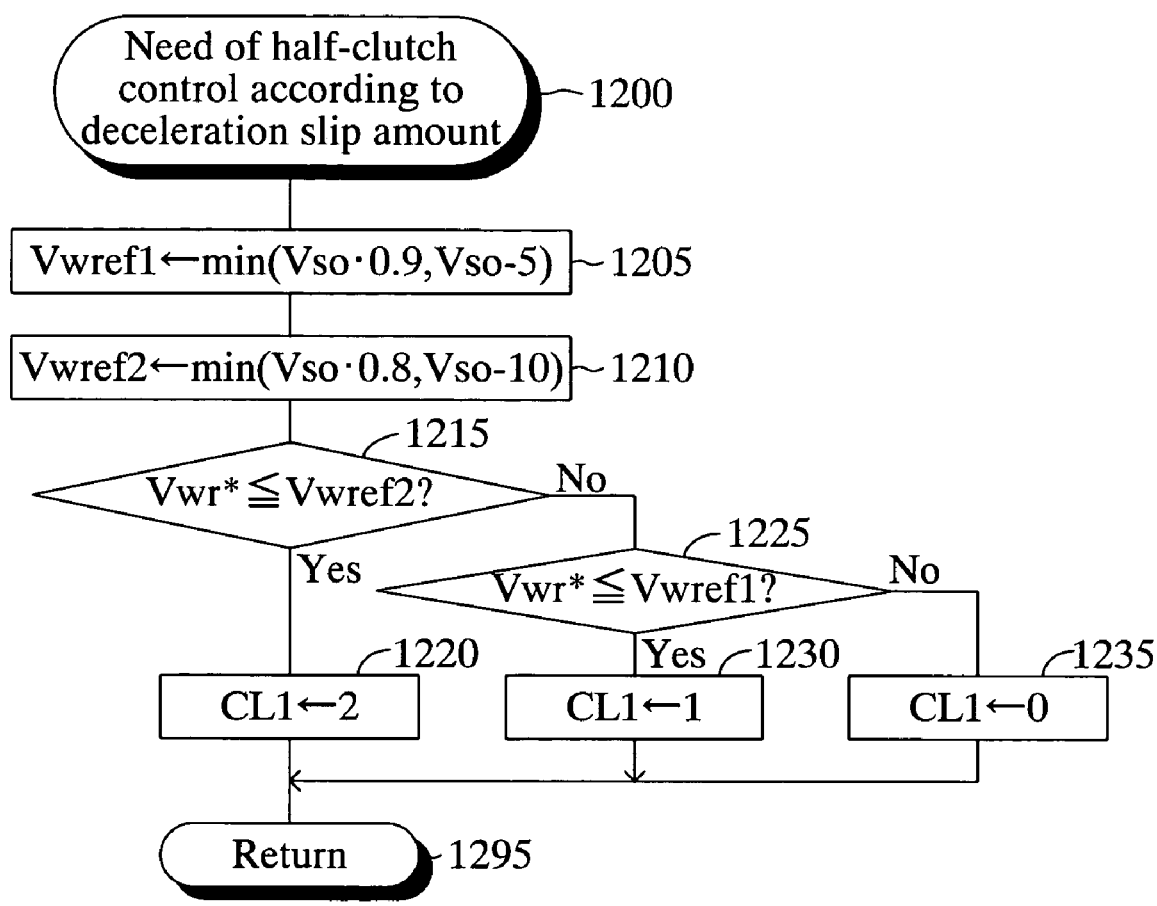
FIG. 12 is a flowchart showing a routine, executed by the CPU shown in FIG. 1, for determining the need of the half-clutch control according to the deceleration slip amount of the driving wheel.
Figure 13:
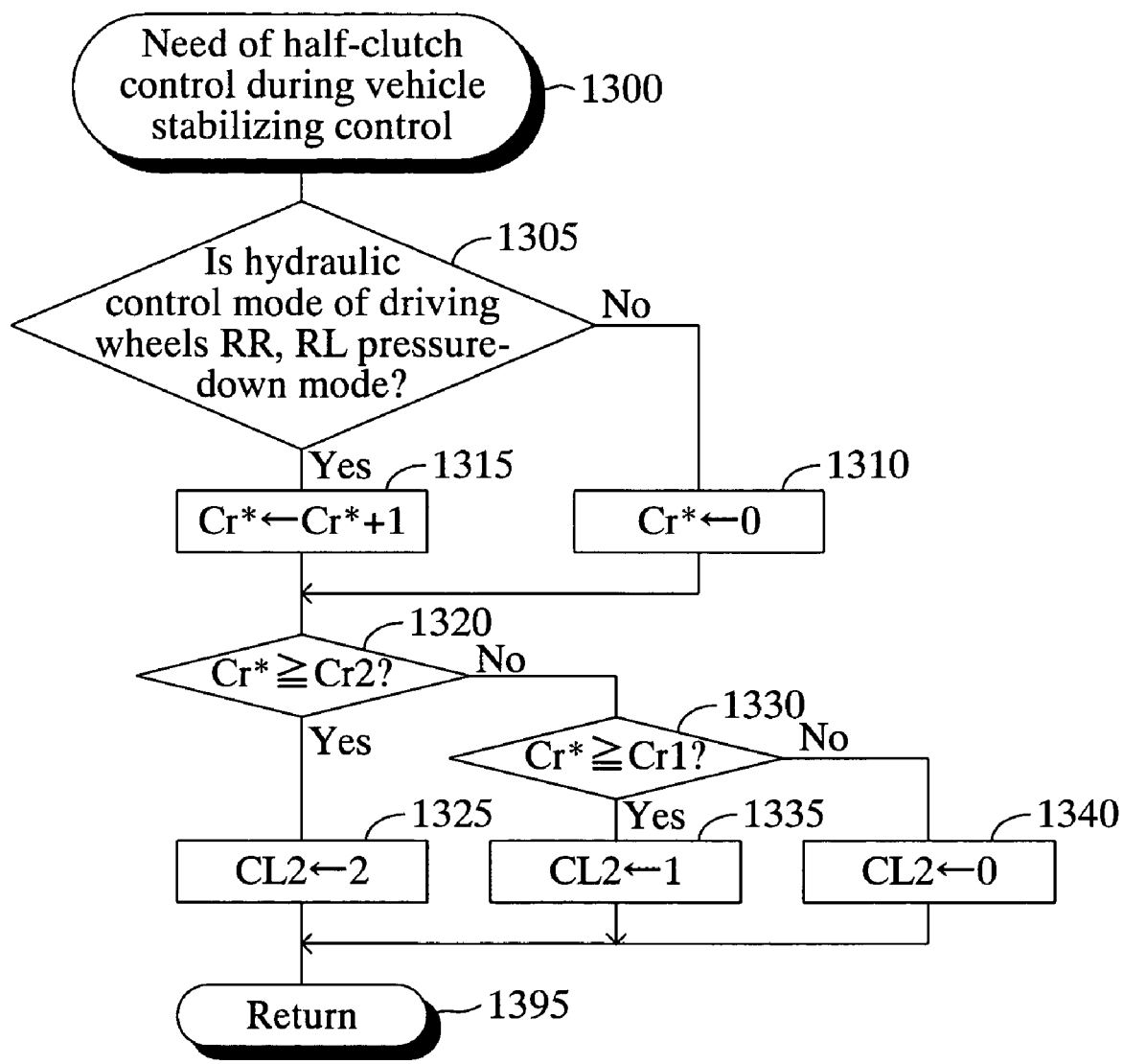
FIG. 13 is a flowchart showing a routine, executed by the CPU shown in FIG. 1, for determining the need of the half-clutch control during the vehicle stabilizing control.
Figure 14:
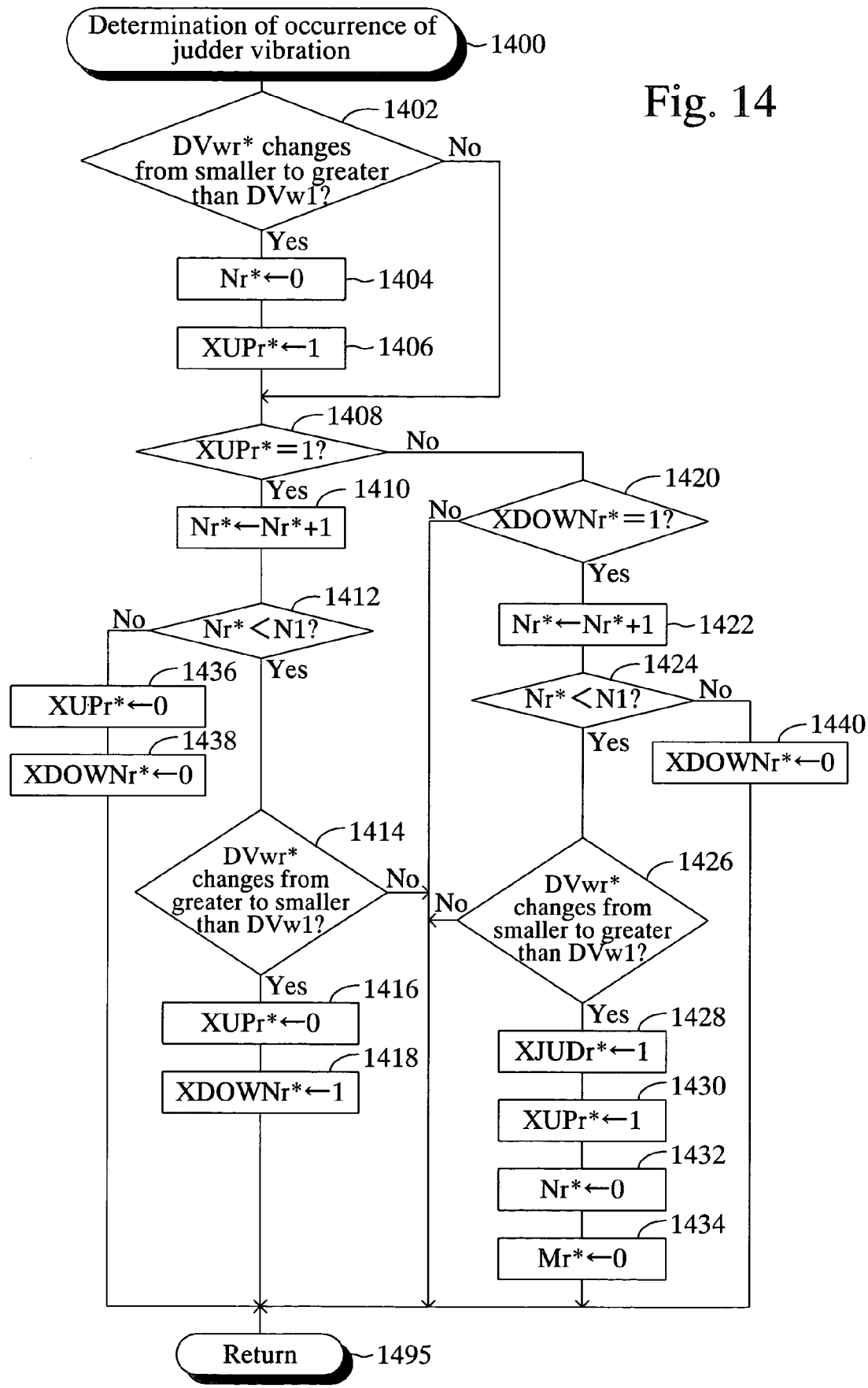
FIG. 14 is a flowchart showing a routine, executed by the CPU shown in FIG. 1, for determining the occurrence of the judder vibration.

The explanation is continued here assuming that the it is immediately after the value of the clutch/gear-shift control now-executing flag XSHIFT is changed from "0" to "1" by executing the process at the step 1020 of FIG. 10. The CPU 51 makes "Yes" determination at the step 1102, and proceeds to a step 1104 for setting a value of a disconnecting operation now-executing flag XCUT to "1". The disconnecting operation now-executing flag XCUT shows that the above-mentioned disconnecting operation is executed when the value thereof is "1", while shows that the disconnecting operation is not executed when the value thereof is "0".

Then, the CPU 51 proceeds to a step 1106 for determining whether the value of the disconnecting operation now-executing flag XCUT is "1" or not. Since the value of the disconnecting operation now-executing flag XCUT is "1" at present, the CPU 51 makes "Yes" determination at the step 1106 to proceed to a step 1108 where it gives to the clutch connecting/disconnecting actuator 24a an instruction to perform the disconnecting operation.

Subsequently, the CPU 51 proceeds to a step 1110 for giving to the throttle valve actuator 22 the instruction of the above-mentioned "control of the opening of the throttle valve during the disconnecting operation". Then, the CPU 51 proceeds to a step 1112 for determining whether the clutch 24 is in the perfect disconnecting state or not. Specifically, the CPU 51 determines whether the clutch connecting/disconnecting actuator 24a outputs the signal showing that the clutch 24 is in the perfect disconnecting state. It is immediately after the disconnecting operation is started at present, so that the CPU 51 proceeds to the step 1112 for making "No" determination, and then, immediately proceeds to a step 1195 to temporarily complete this routine.

After that, a series of processes at step 1100, step 1102 (making "No" determination), steps 1106 (making "Yes" determination) to 1112 (making "No" determination) and step 1195 are repeatedly executed until the clutch 24 becomes the perfect disconnecting state (until the disconnecting operation is finished) due to the advance of the disconnecting operation of the clutch 24. When the clutch 24 becomes the perfect disconnecting state, the CPU 51 makes "Yes" determination at the step 1112 to proceed to a step 1114 where the value of the disconnecting operation now-executing flag XCUT is set to "0". Then, the CPU 51 sets a value of a shift operation now-executing flag XCNG to "1" at a following step 1116, and then, proceeds to the step 1195 to temporarily complete this routine. The shift operation now-executing flag XCNG shows that the above-mentioned gear-shift operation is executed when the value thereof is "1", while shows that the gear-shift operation is not executed when the value thereof is "0".

Then, the CPU 51 makes "No" determination at the step 1102 and step 1106, and then, proceeds to a step 1118 for determining whether the value of the shift operation now-executing flag XCNG is "1" or not. Since the value of the shift operation now-executing flag XCNG is "1" at present due to the process at the step 1116, the CPU 51 makes "Yes" determination at the step 1118 to proceed to a step 1120 where it gives an instruction to the gear-shift actuator 25a for shifting the stage of the transmission 25 to the target stage.

Subsequently, the CPU 51 proceeds to a step 1122 for giving to the throttle valve actuator 22 an instruction of the above-mentioned "control of the opening of the throttle valve during the shift operation". Then, the CPU 51 proceeds to a step 1124 for determining whether the gear-shift operation to the target stage is completed or not. Specifically, the CPU 51 determines whether the gear-shift actuator 25a outputs the signal showing that the gear-shift operation is completed. It is immediately after the gear-shift operation by the gear-shift actuator 25a is started at present, so that the CPU 51 proceeds to a step 1124 for making "No" determination, and then, immediately proceeds to the step 1195 to temporarily complete this routine.

After that, a series of processes at step 1100, step 1102 (making "No" determination), step 1106 (making "No" determination), steps 1118 (making "Yes" determination) to 1124 (making "No" determination) and step 1195 are repeatedly executed until the gear-shift operation is completed. When the gear-shift operation is completed, the CPU 51 makes "Yes" determination at a step 1124 to proceed to a step 1126 where the value of the shift operation now-executing flag XCNG is set to "0". Then, the CPU 51 sets a value of a connecting operation now-executing flag XCONNECT to "1" at a following step 1128, and then, proceeds to the step 1195 to temporarily complete this routine. The connecting operation now-executing flag XCONNECT shows that the above-mentioned connecting operation is executed when the value thereof is "1", while shows that the connecting operation is not executed when the value thereof is "0".

Then, the CPU 51 makes "No" determination at steps 1102, 1106 and 1118, and then, proceeds to a step 1130 for determining whether the value of the connecting operation now-executing flag XCONNECT is "1" or not. Since the value of the connecting operation now-executing flag XCONNECT is "1" at present due to the process at the step 1128, the CPU 51 makes "Yes" determination at the step 1130 to proceed to a step 1132 where it gives to the clutch connecting/disconnecting actuator 24a an instruction to perform the connecting operation.

Subsequently, the CPU 51 proceeds to a step 1134 for giving to the throttle valve actuator 22 an instruction of the above-mentioned "control of the opening of the throttle valve during the connecting operation". Then, the CPU 51 proceeds to a step 1136 for determining whether the clutch 24 is in the perfect connecting state. Specifically, the CPU 51 determines whether the clutch connecting/disconnecting actuator 24a outputs the signal showing that the clutch 24 is in the perfect connecting state. It is immediately after the connecting operation is started at present, so that the CPU 51 proceeds to the step 1136 for making "No" determination, and then, immediately proceeds to the step 1195 to temporarily complete this routine.

After that, a series of processes at step 1100, step 1102 (making "No" determination), step 1106 (making "No" determination), step 1118 (making "No" determination), steps 1130 (making "Yes" determination) to 1136 (making "No" determination) and step 1195 are repeatedly executed until the clutch 24 is in the perfect connecting state due to the advance of the connecting operation of the clutch 24. When the clutch 24 is in the perfect connecting state, the CPU 51 makes "Yes" determination at the step 1136 to proceed to the step 1138 where the value of the connecting operation now-executing flag XCONNECT is set to "0". Then, the CPU 51 sets the value of the clutch/gear-shift operation now-executing flag XSHIFT to "0" at a following step 1140, and then, proceeds to the step 1195 to temporarily complete this routine. By this process, the clutch/gear-shift control is completed.

After that, by the execution of the routine shown in FIG. 10, the CPU 51 makes "No" determination at all the steps of 1102, 1106, 1118 and 1130 until the value of the clutch/gear-shift control now-executing flag XSHIFT is set again to "1" (until the driver moves the shift lever SL to the UP position or DOWN position with the half-clutch control not executed). Then, the CPU 51 immediately proceeds to the step 1595 to temporarily complete this routine.

Subsequently explained is a determination of a need of the half-clutch control according to the deceleration slip amount of the driving wheel. The CPU 51 repeatedly executes the routine shown in FIG. 12 once every predetermined period. Accordingly, the CPU 51 starts the process from a step 1200 at a predetermined timing, and then, proceeds to a step 1205 for calculating the first deceleration slip determining reference value Vwref1 based upon the estimated vehicle body speed Vso calculated at the step 710 in FIG. 7 and the formula 2. Further, the CPU 51 calculates the second deceleration slip determining reference value Vwref2 based upon the formula 3 at a following step 1210.

Then, the CPU 51 proceeds to a step 1215 for determining whether at least one of the driving wheel speeds Vwr* is not more than the second deceleration slip determining reference value Vwref2 or not. If at least one of the driving wheel speeds Vwr* is not more than the second deceleration slip determining reference value Vwref2, the CPU 51 proceeds to a step 1220 for setting a value of a variable CL1 to "2", and then, proceeds to a step 1295 to temporarily terminate this routine. The variable CL1 is a value representing a control content of the half-clutch control decided from the viewpoint of the deceleration slip amount of the driving wheel, wherein the value of "2" corresponds to the control content in which the clutch 24 is controlled to be brought into the perfect disconnecting state.

On the other hand, if both driving wheel speeds Vwr* are greater than the second deceleration slip determining reference value Vwref2 in the judgement at the step 1215, the CPU 51 makes "No" determination at the step 1215, and then, proceeds to a step 1225 for determining whether at least one of the driving wheel speeds Vwr* is not more than the first deceleration slip determining reference value Vwref1 or not. If at least one of the driving wheel speeds Vwr* is not more than the first deceleration slip determining reference value Vwref1, the CPU 51 makes "Yes" determination at the step 1225, and then, proceeds to a step 1230 for setting the value of the variable CL1 to "1". Thereafter, the CPU 51 proceeds to the step 1295 to temporarily terminate this routine. The value of "1" corresponds here to the control content in which the clutch 24 is controlled to be brought into the half-clutch state.

Moreover, if both driving wheel speeds Vwr* are greater than the first deceleration slip determining reference value Vwref1 in the judgement at the step 1225, the CPU 51 makes "No" determination at the step 1225, and then, proceeds to a step 1235 for setting the value of the variable CL1 to "0". Thereafter, the CPU 51 proceeds to the step 1295 to temporarily terminate this routine. The value of "0" corresponds here to the control content in which the half-clutch control is not executed.

Subsequently explained is a determination of a need of the half-clutch control during the vehicle stabilizing control. The CPU 51 repeatedly executes the routine shown in FIG. 13 once every predetermined period. Accordingly, the CPU 51 starts the process from a step 1300 at a predetermined timing, and then, proceeds to a step 1305 for determining, every driving wheel, that the hydraulic control mode to the driving wheel R* is in the "pressure-down" mode or not during the vehicle stabilizing control. If the hydraulic control mode to the driving wheel R* is not in the "pressure-down" mode, the CPU 51 proceeds to a step 1310 for setting a value of a counter Cr* to "0", and then, proceeds to a step 1320.

On the other hand, if the hydraulic control mode to the driving wheel R* is in the "pressure-down" mode in the judgement at the step 1305, the CPU 51 proceeds to a step 1315 to set a value obtained by adding "1" to the present value as a new value of the counter Cr*, and then, proceeds to a step 1320. Specifically, the value of the counter Cr* is a value corresponding to a time (the aforesaid time Tr*) when the state where the hydraulic control mode to the driving wheel R* is set to the "pressure-down" continues up to the present.

When the CPU 51 proceeds to the step 1320, it determines whether or not at least one of the values of the counter Cr* is not less than a second reference value Cr2 that corresponds to the aforesaid second reference time Tr2. If at least one of the values of the counter Cr* is not less than the second reference value Cr2, the CPU 51 proceeds to a step 1325 for setting a value of a variable CL2 to "2", and then, proceeds to a step 1395 to temporarily terminate this routine. The variable CL 2 is a value representing the control content of the half-clutch control decided from the viewpoint of the convergence time in the pressure-down mode to the driving wheel R* during the vehicle stabilizing control, wherein the value of "2" corresponds to the control content in which the clutch 24 is controlled to be brought into the perfect disconnecting state, like the value of "2" of the variable CL1.

On the other hand, if both values of the counter Cr* are less than the second reference value Cr2 in the judgement at the step 1320, the CPU 51 makes "No" determination at the step 1320, and then, proceeds to a step 1330 for determining whether at least one of the values of the counter Cr* is not less than a first reference value Cr1 that corresponds to the aforesaid first reference time Tr1. If at least one of the values of the counter Cr* is not less than the first reference value Cr1, the CPU 51 makes "Yes" determination at the step 1330 to proceed to a step 1335 where the value of the variable CL2 is set to "1". Then, the CPU 51 proceeds to the step 1395 to temporarily terminate this routine. The value of "1" corresponds here to the control content in which the clutch 24 is controlled to be brought into the half-clutch state, like the value of "1" of the variable CL1.

Moreover, if both values of the counter Cr* are less than the first reference value Cr1 in the judgement at the step 1330, the CPU 51 makes "No" determination at the step 1330, and then, proceeds to a step 1340 for setting the value of the variable CL2 to "0". Then, the CPU 51 proceeds to the step 1395 to temporarily terminate this routine. The value of "0" corresponds here to the control content in which the half-clutch control is not executed, like the value of "0" of the variable CL1.

Subsequently explained is a determination of the occurrence of the judder vibration. The CPU 51 repeatedly executes the routine shown in FIG. 14 once every predetermined period and every driving wheel. Accordingly, the CPU 51 starts the process from a step 1400 at a predetermined timing, and then, proceeds to a step 1402 for determining whether the driving wheel acceleration DVwr* of the driving wheel R* is changed from a value smaller than the positive reference value DVw1 to a value greater than the same.

The explanation is continued here assuming that the driving wheel acceleration DVwr* of the driving wheel R* is changed from a value smaller than the positive reference value DVw1 to a value greater than the same (see the time t1 in FIG. 6). The CPU 51 proceeds to a step 1404 for setting a value of a counter Nr* to "0", Whereupon a value of an increasing/passing flag XUPr* is set to "1" at a following step 1406. Then, the CPU 51 proceeds to a step 1408. The counter Nr* is a counter here for performing the judder vibration occurrence determination. Further, the increasing/passing flag XUPr* represents that the driving wheel acceleration DVwr* of the driving wheel R* is changed from a value smaller than the positive reference value DVw1 to a value greater than the same when the value thereof is "1", while represents that the driving wheel acceleration DVwr* of the driving wheel R* is not changed from a value smaller than the positive reference value DVw1 to a value greater than the same when the value thereof is "0".

When the CPU 51 proceeds to the step 1408, it determines whether the value of the increasing/passing flag XUPr* is "1" or not. Since the value of the increasing/passing flag XUPr* is "1" at present, the CPU 51 makes "Yes" determination at the step 1408 to proceed to a step 1410 where the value obtained by adding "1" to the value of the counter Nr* at present is set as a new value of the counter Nr*.

Then, the CPU 51 proceeds to a step 1412 for determining whether the value of the counter Nr* is less than a reference value N1 that corresponds to the aforesaid judder vibration occurrence reference time T1. Since the value of the counter Nr* is "1" at present, which means that it is less than the reference value N1, the CPU 51 makes "Yes" determination at the step 1412 to proceed to a step 1414 where the determination is made as to whether the driving wheel acceleration DVwr* of the driving wheel R* is changed from a value greater than the negative reference value DVw2 to a value smaller than the same. Since it is immediately after the driving wheel acceleration DVwr* of the driving wheel R* is changed from a value smaller than the positive reference value DVw1 to a value greater than the same at present, the CPU makes "No" determination at the step 1414, and then, proceeds directly to a step 1495 to temporarily terminate this routine.

After that, a series of processes at step 1400, step 1402 (making "No" determination), step 1408 (making "Yes" determination), step 1412 (making "Yes" determination), step 1414 (making "No" determination) and step 1495 are repeatedly executed until the driving wheel acceleration DVwr* of the driving wheel R* is changed from a value greater than the negative reference value DVw2 to a value smaller than the same, while the value of the counter Nr* that is incremented by the repeated process at the step 1410 is less than the reference value N1.

Assuming that a predetermined time has elapsed and the driving wheel acceleration DVwr* of the driving wheel R* is changed from a value greater than the negative reference value DVw2 to a value smaller than the same during when the value of the counter Nr* is less than the reference value N1 (see the time t2 in FIG. 6). When the CPU 51 proceeds to the step 1414, it makes "Yes" determination to proceed to a step 1416 for setting the value of the increasing/passing flag XUPr* to "0". Thereafter, the CPU 51 sets a value of a decreasing/passing flag XDOWNr* to "1" at a next step 1418, and then, proceeds to the step 1495 to temporarily terminate this routine. The decreasing/passing flag XDOWNr* represents that the driving wheel acceleration DVwr* of the driving wheel R* is changed from a value greater than the negative reference value DVw2 to a value smaller than the same when the value thereof is "1", while represents that the driving wheel acceleration DVwr* of the driving wheel R* is not changed from a value greater than the negative reference value DVw2 to a value smaller than the same when the value thereof is "0".

After that, the CPU 51 makes "No" determination at steps 1402 and 1408, and then, proceeds to a step 1420 for determining whether the value of the decreasing/passing flag XDOWNr* is "1" or not. Since the value of the decreasing/passing flag XDOWNr* is "1" at present due to the process at the step 1418, the CPU 51 makes "Yes" determination at the step 1420 to proceed to a step 1422 where the value obtained by incrementing the value of the counter Nr* at present by "1" is set as a new value of the counter Nr*.

Subsequently, the CPU 51 proceeds to a step 1424 for determining whether the value of the counter Nr* is less than the reference value N1 or not. The explanation is continued here assuming that the value of the counter Nr* is less than the reference value N1. The CPU 51 makes "Yes" determination at the step 1424 to proceed to a step 1426 where a determination is made as to whether the driving wheel acceleration DVwr* of the driving wheel R* is changed from a value smaller than the positive reference value DVw1 to a value greater than the same. Since it is immediately after the driving wheel acceleration DVwr* of the driving wheel R* is changed from a value greater than the negative reference value DVw2 to a value smaller than the same at present, the CPU makes "No" determination at the step 1426, and then, proceeds directly to the step 1495 to temporarily terminate this routine.

After that, a series of processes at step 1400, step 1402 (making "No" determination), step 1408 (making "No" determination), step 1420 (making "Yes" determination), step 1424 (making "Yes" determination), step 1426 (making "No" determination) and step 1495 are repeatedly executed until the driving wheel acceleration DVwr* of the driving wheel R* is changed from a value smaller than the positive reference value DVw1 to a value greater than the same, while the value of the counter Nr* that is incremented by the repeated process at the step 1422 is less than the reference value N1.

Assuming that a predetermined time has elapsed and the driving wheel acceleration DVwr* of the driving wheel R* is changed from a value smaller than the positive reference value DVw1 to a value greater than the same during when the value of the counter Nr* is less than the reference value N1 (see the time t3 in FIG. 6. At this point, the above-mentioned "judder vibration occurrence determining condition" is established). The CPU 51 proceeds to the step 1426 to make "Yes" determination, and then, proceeds to a step 1428 where a value of a judder vibration determining flag XJUDr* is set to "1". Thereafter, it sets the value of the increasing/passing flag XUPr* to "1" at a following step 1430, sets the value of the counter Nr* to "0" at a following step 1432, sets the value of a counter Mr* to "0" at a following step 1434, and then, proceeds to the step 1495 to temporarily terminate this routine.

The judder vibration determining flag XJUDr* represents here that the judder vibration occurs and continues at the side of the driving wheel R* when the value thereof is "1", while represents that the judder vibration does not occur (ends) at the side of the driving wheel R* when the value thereof is "0". Further, the counter Mr* is a counter for performing the judder vibration end determination in the routine in FIG. 15 described later.

As described above, the value of the judder vibration determining flag XJUDr* is set to "1" every time the "judder vibration occurrence determining condition" is established, and the value of the counter Nr* and the value of the counter Mr* are cleared to "0". After that, the CPU 51 makes "No" determination at the step 1402 and "Yes" determination at the step 1408, whereupon it executes again the process same as the above-mentioned process.

Subsequently explained is the case where the "No" determination is made at the step 1412, i.e., in case where the driving wheel acceleration DVwr* of the driving wheel R* is not changed from a value greater than the negative reference value DVw2 to a value smaller than the same during when the value of the counter Nr* is less than the reference value N1 (during when the judder vibration occurrence reference time T1 has elapsed in FIG. 6). The CPU 51 proceeds to the step 1412 for making "No" determination, and then, proceeds to a step 1436 for setting the value of the increasing/passing flag XUPr* to "0". At the next step 1438, it sets the value of the decreasing/passing flag XDOWNr* to "0", and then, proceeds to the step 1495 to temporarily terminate this routine. This case corresponds to the case where the "judder vibration occurrence determining condition" is not established.

After that, the CPU 51 makes "No" determination at all the steps of 1402, 1408 and 1420 up to when the driving wheel acceleration DVwr* of the driving wheel R* is changed from a value smaller than the positive reference value DVwr* to a value greater than the same, and during when this process is repeated, the value of the counter Mr* is not cleared to "0".

Subsequently explained is the case where the "No" determination is made at the step 1424, i.e., in case where the driving wheel acceleration DVwr* of the driving wheel R* is not changed again from a value smaller than the positive reference value DVwr* to a value greater than the same during when the value of the counter Nr* is less than the reference value N1 (during when the judder vibration occurrence reference time T1 has elapsed in FIG. 6). The CPU 51 proceeds to the step 1424 for making "No" determination, and then, proceeds to a step 1440 for setting the value of the decreasing/passing flag XDOWNr* to "0". Then, the CPU 51 proceeds to the step 1495 to temporarily terminate this routine. This case also corresponds to the case where the "judder vibration occurrence determining condition" is not established. It is to be noted that, in this case, the value of the increasing/passing flag XUPr* is also set to "0" due to the process at the step 1416.

After that, the CPU 51 makes "No" determination at all the steps of 1402, 1408 and 1420 up to when the driving wheel acceleration DVwr* of the driving wheel R* is changed from a value smaller than the positive reference value DVwr* to a value greater than the same, and during when this process is repeated, the value of the counter Mr* is not cleared to "0".

Figure 15:
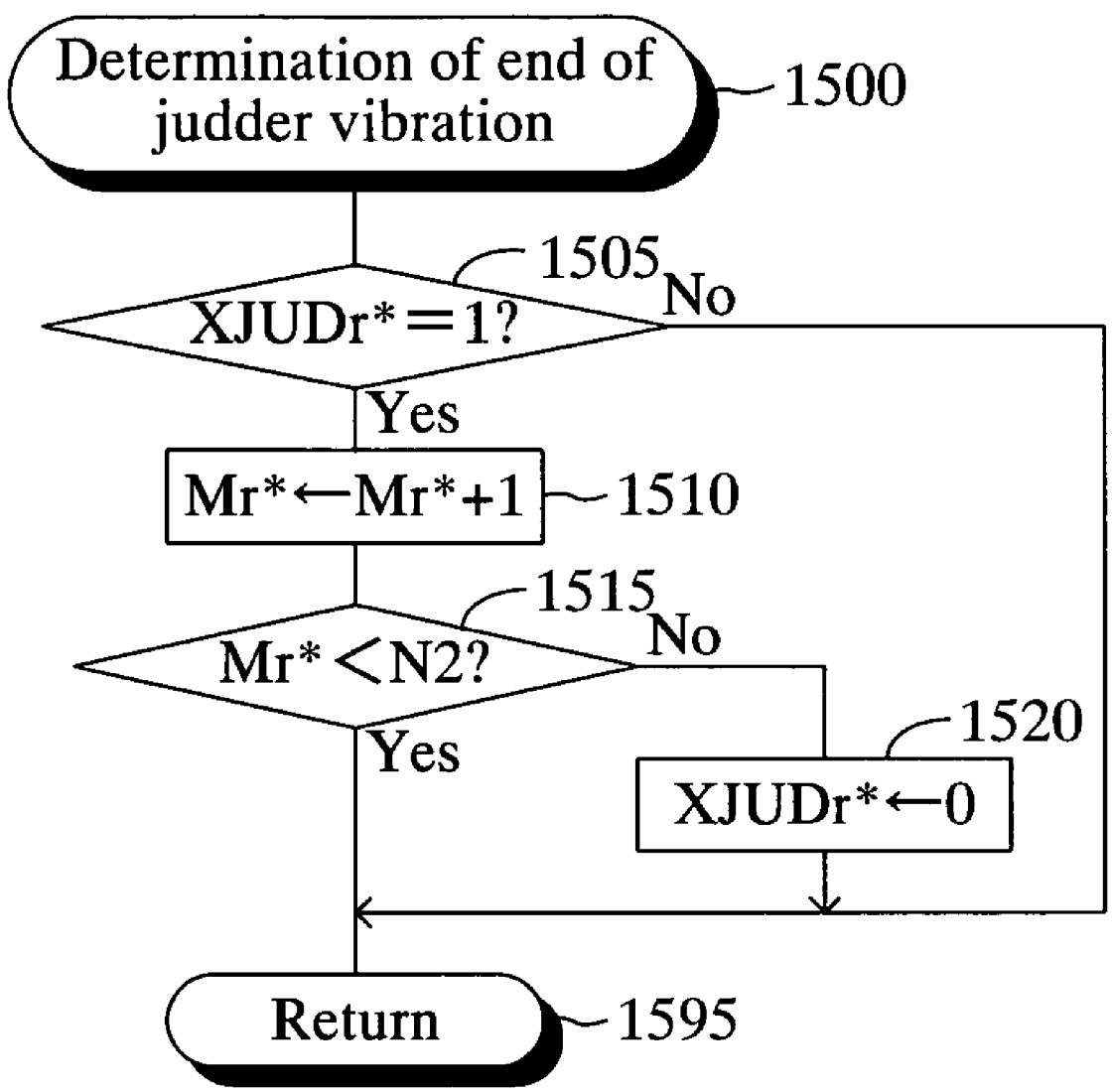
FIG. 15 is a flowchart showing a routine, executed by the CPU shown in FIG. 1, for determining an end of the judder vibration.

Further, the CPU 51 repeatedly executes a routine for performing the determination of the end of the judder vibration shown with flowchart in FIG. 15 once every predetermined period and every driving wheel. Accordingly, the CPU 51 starts the process from a step 1500 at a predetermined timing, and then, proceeds to a step 1505 for determining whether the value of the judder vibration determining flag XJUDr* is "1" or not. If the value of the judder vibration determining flag XJUDr* is not "1", i.e., when the judder vibration does not occur at the side of the driving wheel R*, it is unnecessary to execute the determination of the end of the judder vibration at the side of the driving wheel R*, so that the CPU 51 directly proceeds to a step 1595 to temporarily terminate this routine.

The explanation is continued assuming that the value of the judder vibration determining flag XJUDr* is "1". The CPU 51 makes "Yes" determination at the step 1505, and proceeds to a step 1510 where the value obtained by incrementing the value of the counter Mr* at present by "1" is set as a new value of the counter Mr*.

Then, the CPU 51 proceeds to a step 1515 for determining whether the value of the counter Mr* is less than the reference value N2 that corresponds to the aforesaid judder vibration end reference time T2. If the value of the counter Mr* is less than the reference value N2 that corresponds to the aforesaid judder vibration end reference time T2, the end condition of the judder vibration at the side of the driving wheel R* is not established, whereby the CPU 51 directly proceeds to the step 1595 to temporarily terminate this routine with the value of the judder vibration determining flag XJUDr* kept to be "1".

On the other hand, if the value of the counter Mr* is not less than the reference value N2 in the judgement at the step 1515, the end condition of the judder vibration at the side of the driving wheel R* is established, whereby the CPU 51 proceeds to a step 1520 for setting the value of the judder vibration determining flag XJUDr* to "0", and then, proceeds to the step 1595 to temporarily terminate this routine.

Figure 16:
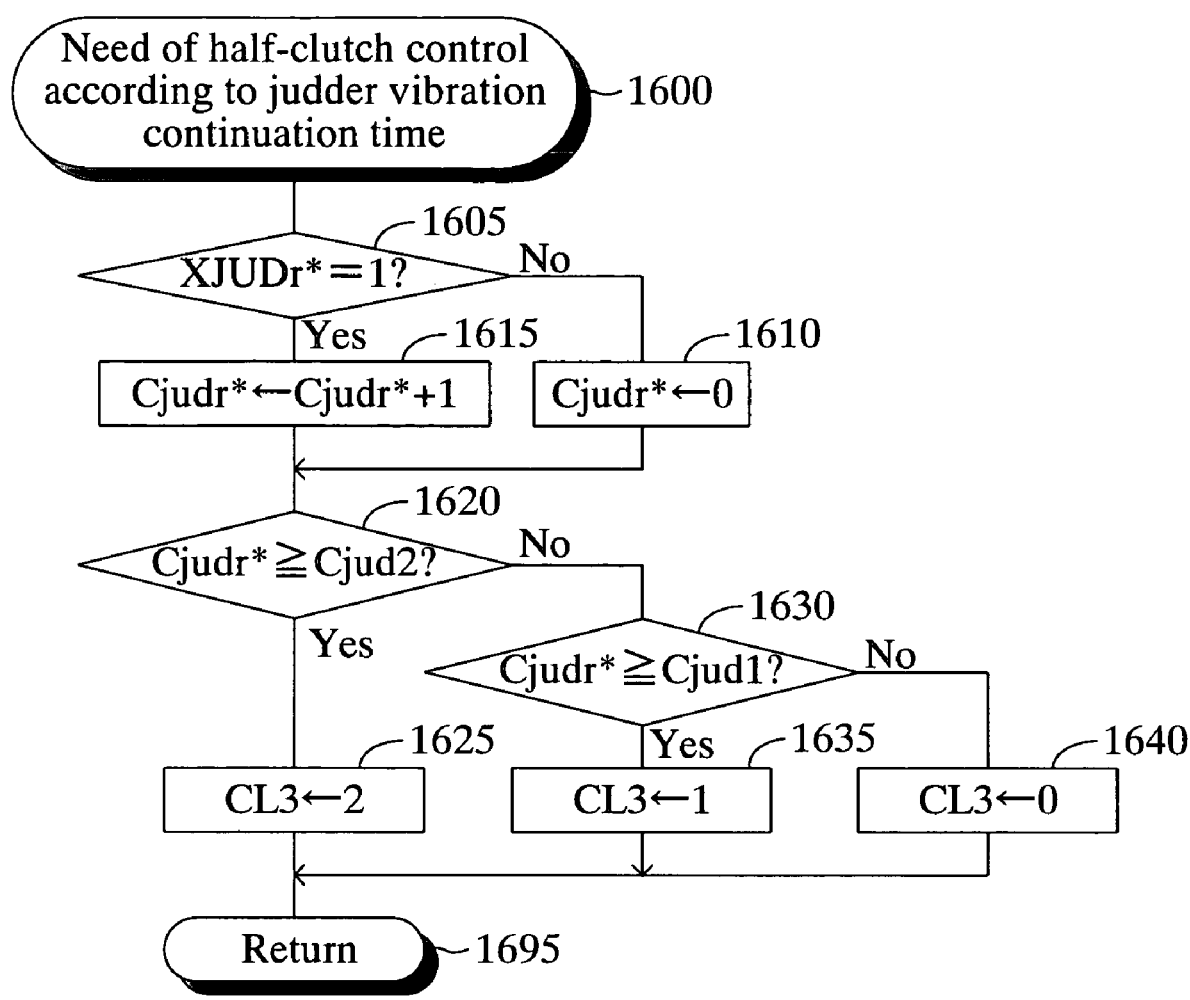
FIG. 16 is a flowchart showing a routine, executed by the CPU shown in FIG. 1, for determining the need of the half-clutch control according to a judder vibration continuation time.
Figure 17:
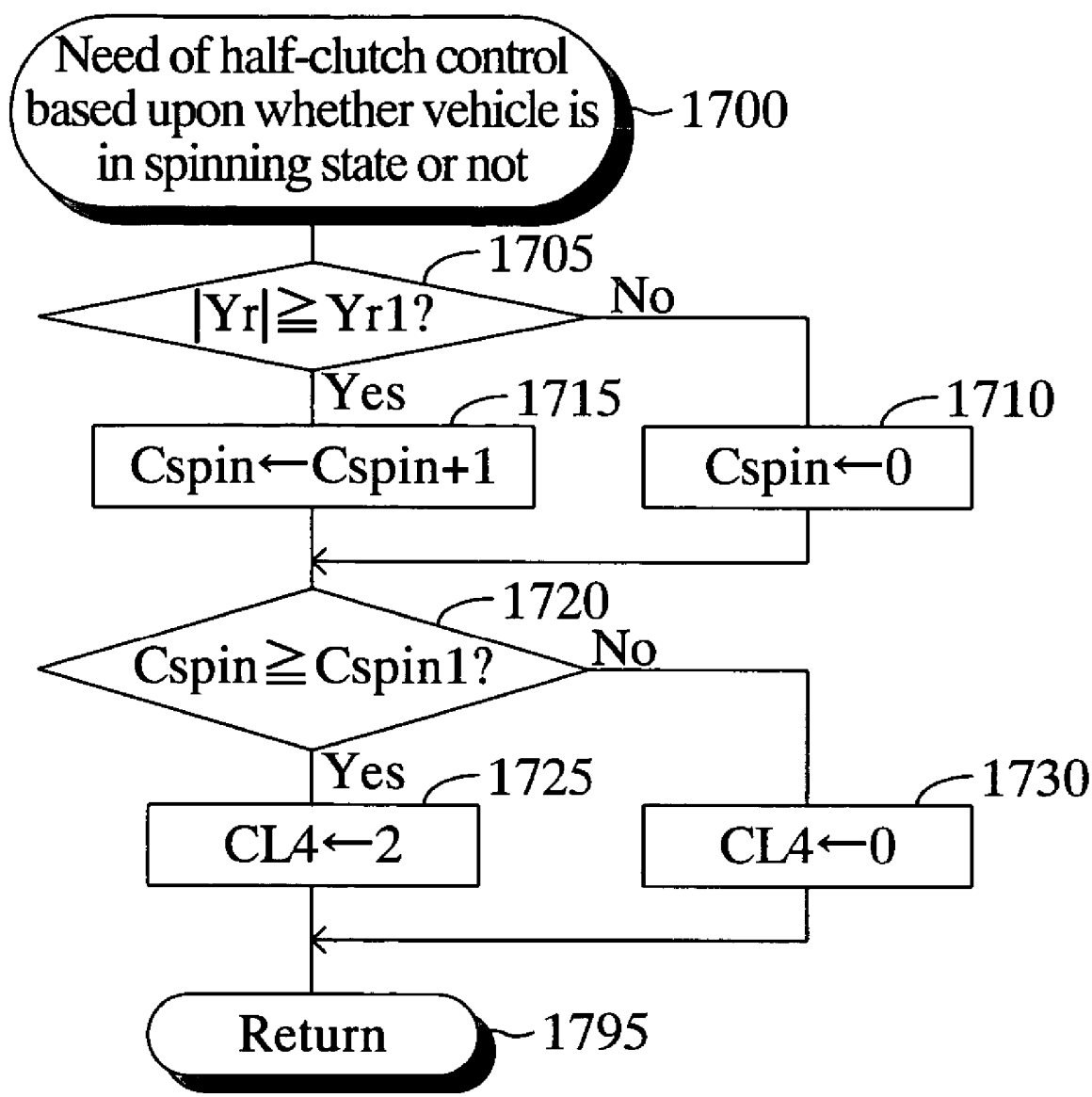
FIG. 17 is a flowchart showing a routine, executed by the CPU shown in FIG. 1, for determining the need of the half-clutch control based upon whether the vehicle is in a spinning state or not.
Figure 18:
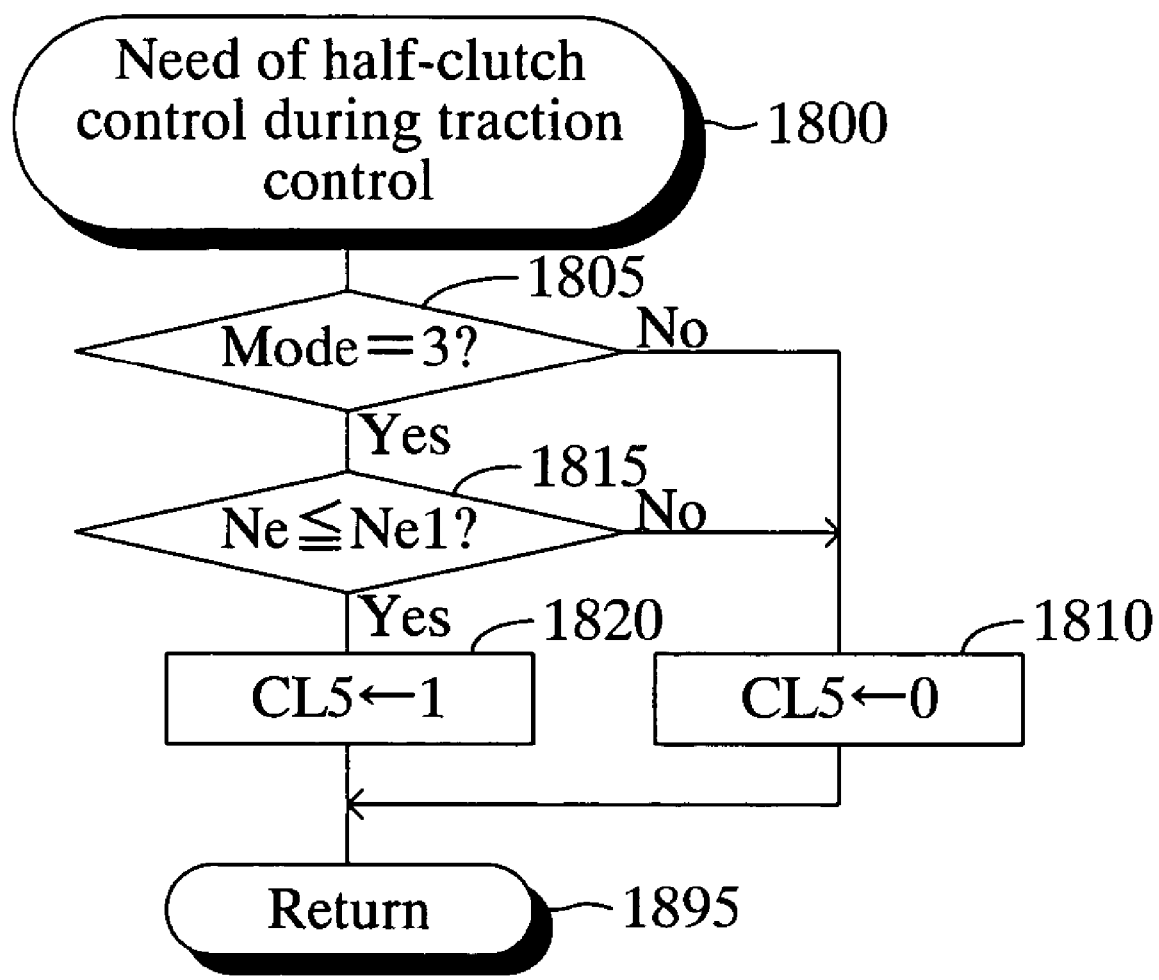
FIG. 18 is a flowchart showing a routine, executed by the CPU shown in FIG. 1, for determining the need of the half-clutch control during a traction control.

Further, the CPU 51 repeatedly executes, once every predetermined period, the routine for performing a determination of a need of the half-clutch control according to the judder vibration continuation time shown with a flowchart in FIG. 16. Accordingly, the CPU 51 starts the process from a step 1600 at a predetermined timing, and then, proceeds to a step 1605 for determining, every driving wheel, that the value of the judder vibration determining flag XJUDr* becomes "1" or not. If the value of the judder vibration determining flag XJUDr* to the driving wheel R* is not "1", the CPU 51 proceeds to a step 1610 for setting a value of a counter Cjudr* to "0", and then, proceeds to a step 1620.

On the other hand, if the value of the judder vibration determining flag XJUDr* to the driving wheel R* is "1" in the judgement at the step 1605, the CPU 51 proceeds to a step 1615 to set a value obtained by adding "1" to the present value as a new value of the counter Cjudr*, and then, proceeds to a step 1620. Specifically, the value of the counter Cjudr* is a value corresponding to a time (the aforesaid continuation time Tjudr*) when the judder vibration is continued at the side of the driving wheel R* up to the present.

When the CPU 51 proceeds to the step 1620, it determines whether or not at least one of the values of the counter Cjudr* is not less than a second reference value Cjud2 that corresponds to the aforesaid second reference time Tjud2. If at least one of the values of the counter Cjudr* is not less than the second reference value Cjud2, the CPU 51 proceeds to a step 1625 for setting a value of a variable CL3 to "2", and then, proceeds to a step 1695 to temporarily terminate this routine. The variable CL 3 is a value representing the control content of the half-clutch control decided from the viewpoint of the judder vibration continuation time, wherein the value of "2" corresponds to the control content in which the clutch 24 is controlled to be brought into the perfect disconnecting state, like the value of "2" of the variable CL1.

On the other hand, if both values of the counter Cjudr* are less than the second reference value Cjud2 in the judgement at the step 1620, the CPU 51 makes "No" determination at the step 1620, and then, proceeds to a step 1630 for determining whether at least one of the values of the counter Cjudr* is not less than a first reference value Cjud1 that corresponds to the aforesaid first reference time Tjud1. If at least one of the values of the counter Cjudr* is not less than the first reference value Cjud1, the CPU 51 makes "Yes" determination at the step 1630 to proceed to a step 1635 where the value of the variable CL3 is set to "1". Then, the CPU 51 proceeds to the step 1695 to temporarily terminate this routine. The value of "1" corresponds here to the control content in which the clutch 24 is controlled to be brought into the half-clutch state, like the value of "1" of the variable CL1.

Moreover, if both values of the counter Cjudr* are less than the first reference value Cjud1 in the judgement at the step 1630, the CPU 51 makes "No" determination at the step 1630, and then, proceeds to a step 1640 for setting the value of the variable CL3 to "0". Then, the CPU 51 proceeds to the step 1695 to temporarily terminate this routine. The value of "0" corresponds here to the control content in which the half-clutch is not executed, like the value of "0" of the variable CL1.

Subsequently explained is a determination of a need of the half-clutch control based upon whether the vehicle is in the spinning state or not. The CPU 51 repeatedly executes the routine shown in FIG. 17 once every predetermined period. Accordingly, the CPU 51 starts the process from a step 1700 at a predetermined timing, and then, proceeds to a step 1705 for determining whether the absolute value of the yaw rate Yr obtained by the yaw rate sensor 43 is not less than the aforesaid yaw rate reference value Yr1 or not. If the absolute value of the yaw rate Yr is less than the yaw rate reference value Yr1, the CPU 51 proceeds to a step 1710 for setting a value of a counter Cspin to "0", and then, proceeds to a step 1720.

On the other hand, if the absolute value of the yaw rate Yr is not less than the yaw rate reference value Yr1 in the judgement at the step 1705, the CPU 51 proceeds to a step 1715 to set a value obtained by adding "1" to the present value as a new value of the counter Cspin, and then, proceeds to a step 1720. Specifically, the value of the counter Cspin is a value corresponding to a time when the state where the absolute value of the yaw rate Yr is not less than the yaw rate reference value Yr1 continues up to the present.

Then, the CPU 51 proceeds to the step 1720 for determining whether the value of the counter Cspin is not less than a reference value Cspin1 corresponding to the aforesaid spin determining reference time Tspin1 or not. If the value of the counter Cspin is not less than the reference value Cspin1, which means that the vehicle is in the spinning state, the CPU 51 proceeds to a step 1725 for setting a value of a variable CL4 to "2", and then, proceeds to a step 1795 to temporarily terminate this routine. The variable CL4 is a value representing the control content of the half-clutch control decided from the viewpoint of whether the vehicle is in the spinning state or not, wherein the value of "2" corresponds to the control content in which the clutch 24 is controlled to be brought into the perfect disconnecting state, like the value of "2" of the variable CL1.

On the other hand, if both values of the counter Cspin are less than the reference value Cspin1 in the judgement at the step 1720, the CPU 51 proceeds to a step 1730 for setting the value of the variable CL4 to "0", and then, proceeds to the step 1795 to temporarily terminate this routine. The value of "0" corresponds here to the control content in which the half-clutch is not executed, like the value of "0" of the variable CL1.

Subsequently explained is a determination of a need of the half-clutch control during the traction control. The CPU 51 repeatedly executes the routine shown in FIG. 18 once every predetermined period. Accordingly, the CPU 51 starts the process from a step 1800 at a predetermined timing, and then, proceeds to a step 1805 for determining whether the value of the variable Mode set at the routine shown in FIG. 8 is "3" or not, i.e., determining whether the traction control is now being executed or not. If the traction control is not executed, the CPU 51 proceeds to a step 1810 for setting a value of a variable CL5 to "0", and then, proceeds to a step 1895 to temporarily terminate this routine.

The variable CL5 is a value representing the control content of the half-clutch control decided from the viewpoint of whether or not there is a possibility of the occurrence of the engine stall during the traction control, wherein the value of "0" corresponds here to the control content in which the half-clutch control is not executed, like the value of "0" of the variable CL1.

When the value of the variable Mode is "3" in the judgement at the step 1805, the CPU 51 proceeds to a step 1815 for determining whether the engine revolution speed Ne obtained by the revolution speed sensor 46 is not less than the aforesaid engine revolution speed reference value Ne1 or not. If the engine revolution speed Ne is greater than the engine revolution speed reference value Ne1, which means that there is no possibility of the occurrence of the engine stall, the CPU 51 proceeds to the step 1810 for setting the value of the variable CL5 to "0" like the above-mentioned case, and then, proceeds to the step 1895 to temporarily terminate this routine.

Moreover, if the engine revolution speed Ne is not more than the engine revolution speed reference value Ne1 in the judgement at the step 1815, which means that there is a possibility of the occurrence of the engine stall, the CPU 51 proceeds to a step 1820 for setting the value of the variable CL5 to "1", and then, proceeds to the step 1895 to temporarily terminate this routine. The value of "1" corresponds here to the control content in which the clutch 24 is controlled to be brought into the half-clutch state, like the value of "1" of the variable CL1.

Subsequently explained is a final determination of a need of the half-clutch control. The CPU 51 repeatedly executes the routine shown in FIG. 19 once every predetermined period. Accordingly, the CPU 51 starts the process from a step 1900 at a predetermined timing, and then, proceeds to a step 1905 for determining whether the value of the clutch/gear-shift control now-executing flag XSHIFT is "0" or not. If the value of the clutch/gear-shift control now-executing flag XSHIFT is "1", the CPU 51 immediately proceeds to a step 1995 to temporarily terminate this routine. Specifically, during when the clutch/gear-shift control is executed at the routine in FIG. 11, the determination of the need of the half-clutch control is not executed, and therefore, the half-clutch control is not executed.

The explanation is continued here assuming that the value of the clutch/gear-shift control now-executing flag XSHIFT is "0". The CPU 51 makes "Yes" determination at the step 1905 and moves to a step 1910 for storing in a variable CLUTCH the maximum value of the values of the variables CL1 to CL5 each decided in the routines in FIGS. 12, 13 and 16 to 18. The variable CLUTCH is a value here representing the finally decided control content of the half-clutch control, and it is set to any one of the values of "0" to "2". The values of "0" to "2" respectively correspond to the case where the half-clutch is not executed, the case where the clutch 24 is controlled to be brought into the half-clutch state and the case where the clutch 24 is controlled to be brought into the perfect disconnecting state.

Then, the CPU 51 moves to a step 1915 for determining whether the value of the variable CLUTCH is "0" or not. If the value of the variable CLUTCH is "0", the CPU 51 proceeds to a step 1920 for setting the value of the half-clutch control now-executing flag XHALF to "0", and then, proceeds to a step 1995 to temporarily terminate this routine. On the other hand, is the value of the variable CLUTCH is other than "0" in the judgement at the step 1915, the CPU 51 moves to a step 1925 for setting the value of the half-clutch control now-executing flag XHALF to "1", and then, proceeds to the step 1995 to temporarily terminate this routine.

Subsequently explained is the execution of the half-clutch control. The CPU 51 repeatedly executes the routine shown in FIG. 20 once every predetermined period. Accordingly, the CPU 51 starts the process from a step 2000 at a predetermined timing, and then, proceeds to a step 2005 for determining whether the value of the clutch/gear-shift control now-executing flag XSHIFT is "0" or not. If the value of the clutch/gear-shift control now-executing flag XSHIFT is "1", the CPU 51 immediately proceeds to a step 2095 to temporarily terminate this routine.

The explanation is continued here assuming that the value of the clutch/gear-shift control now-executing flag XSHIFT is "0" and the value of the half-clutch control now-executing flag XHALF is "1". The CPU 51 makes "Yes" determination at the step 2005 and moves to a step 2010 for determining whether the value of the half-clutch control now-executing flag XHALF is "1" or not.

Figure 19:
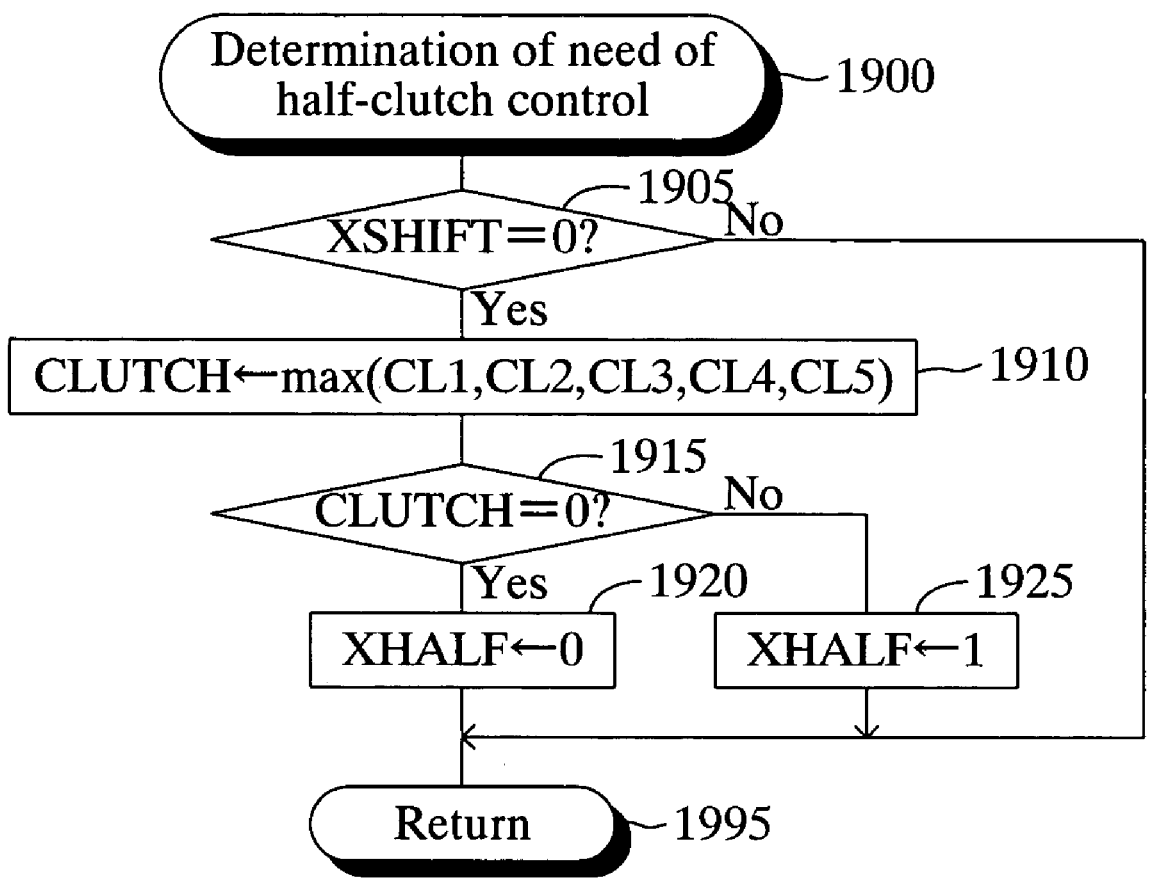
FIG. 19 is a flowchart showing a routine, executed by the CPU shown in FIG. 1, for finally determining the need of the half-clutch control.
Figure 20:
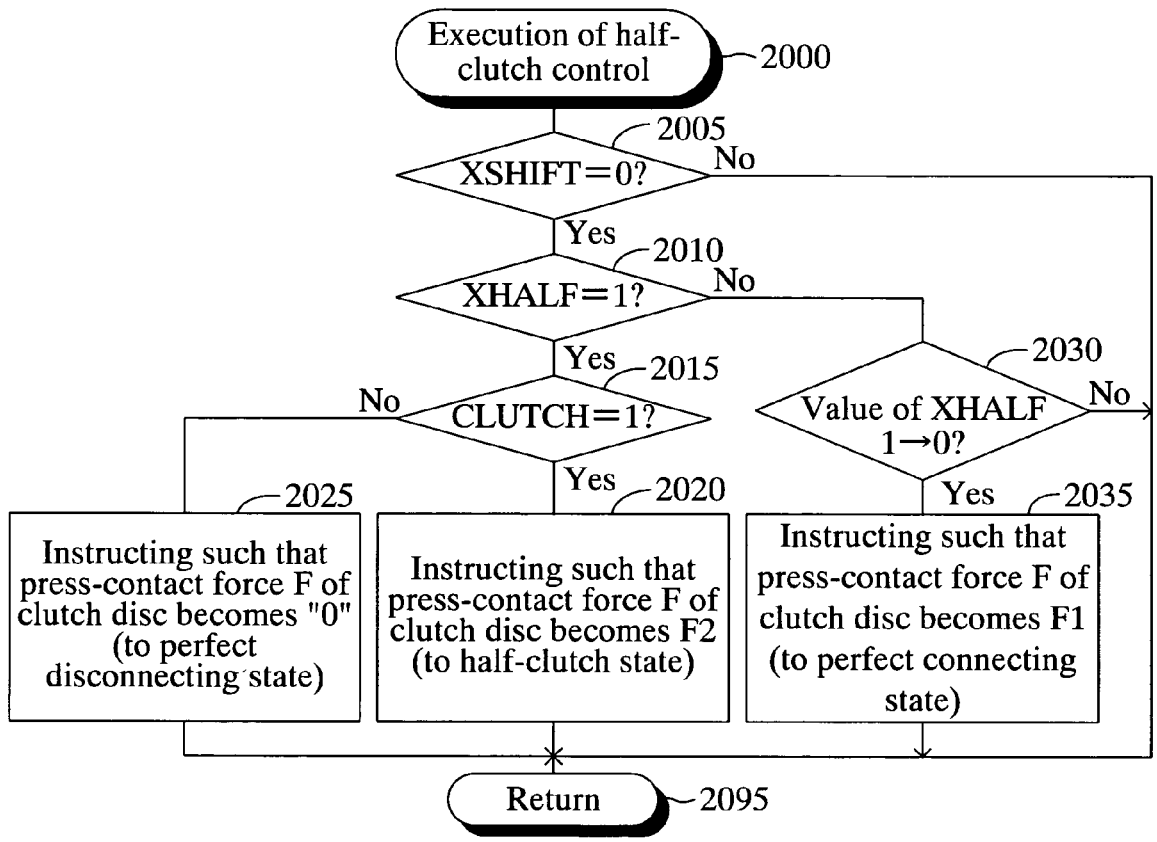
FIG. 20 is a flowchart showing a routine, executed by the CPU shown in FIG. 1, for executing the half-clutch control.

Since the value of the half-clutch control now-executing flag XHALF is "1" at present, the CPU 51 makes "Yes" determination at the step 2010, and then moves to a step 2015 for determining whether the value of the variable CLUTCH decided at the routine of FIG. 19 becomes "1" or not. If the variable CLUTCH becomes "1", the CPU 51 moves to a step 2020 for giving instruction to the clutch connecting/disconnecting actuator 24a for controlling the driving force of the clutch connecting/disconnecting actuator 24a such that the press-contact force F of the clutch disc of the clutch 24 becomes the aforesaid force F2. Then, the CPU 51 moves to the step 2095 to temporarily terminate this routine. This process brings the clutch 24 into the half-clutch state.

On the other hand, if the value of the variable CLUTCH is other than "1" in the judgement at the step 2015, i.e., it becomes "2", the CPU 51 moves to a step 2025 for giving instruction to the clutch connecting/disconnecting actuator 24a for controlling the driving force of the clutch connecting/disconnecting actuator 24a such that the press-contact force F of the clutch disc of the clutch 24 becomes "0". Then, the CPU 51 moves to the step 2095 to temporarily terminate this routine. This process brings the clutch 24 into the perfect disconnecting state.

After that, the CPU 51 makes "Yes" determination at both the steps 2005 and 2010 so long as the value of the half-clutch control now-executing flag XHALF is "1", resulting in that the half-clutch control is continuously executed by the execution of the process at the step 2020 or 2025.

Subsequently explained is the case where the value of the half-clutch control now-executing flag is "1" and it is changed to "0" by the execution of the routine at the step 1920 of FIG. 19 from the state where the half-clutch control is executed by the process at the step 2020 or 2025, i.e., the case where the half-clutch control becomes unnecessary. The CPU 51 moves to the step 2010 for making "No" determination, and then, proceeds to a step 2030 for determining it is immediately after the value of the half-clutch control now-executing flag XHALF is changed from "1" to "0".

Since it is immediately after the value of the half-clutch control now-executing flag XHALF is changed from "1" to "0" at present, the CPU 51 makes "Yes" determination at the step 2030, and then, move to a step 2035 to give instruction to the clutch connecting/disconnecting actuator 24a for controlling the driving force of the clutch connecting/disconnecting actuator 24a such that the press-contact force F of the clutch disc of the clutch 24 becomes the aforesaid maximum value F1 (i.e., such that the driving force of the clutch connecting/disconnecting actuator 24a becomes "0"). Then, the CPU 51 moves to the step 2095 to temporarily terminate this routine. This process brings the clutch 24 into the perfect connecting state, thereby completing the half-clutch control.

After that, the CPU 51 repeatedly executes the processes at the steps 2000, 2005 (making "Yes" determination), 2010 (making "No" determination), 2030 (making "No" determination) and 2095 so long as the clutch/gear-shift control or the half-clutch control is not started.

As explained above, the automatic clutch control device according to the present invention executes the half-clutch control, according to the running state of the vehicle, from the following five viewpoints: the deceleration slip amount (Vso−Vwr*) of the driving wheel R*; the convergence time Tr* of the driving wheel speed Vwr* to the driving wheel R* in the pressure-down mode during the vehicle stabilizing control; the continuation time Tjudr* of the judder vibration; whether the vehicle is in the spinning state or not; and whether there is a possibility that the engine stall occurs during the traction control, whereby the clutch 24 is controlled to be brought into either one of the half-clutch state or the disconnecting state, regardless of the gear-shift operation. As a result, this device can attain at least one or more objects of the improvement in stability of the vehicle, improvement in precision of the vehicle stabilizing control, improvement of comfortableness of the occupant and prevention of the occurrence of the engine stall.

The present invention is not limited to the above-mentioned embodiments, but various modifications can be applied within the scope of the invention. For example, the transmission 25 is a manual transmission in which the shift operation is performed by the operation of the shift lever by the driver in the aforesaid embodiment, but an automatic transmission can be applied in which the shift operation is automatically performed according to the running state of the vehicle, not by the shift lever operation by the driver.

Further, although the electrical control apparatus 50 (CPU 51) performs the above-mentioned all calculations, determinations, directions or the like in the aforesaid embodiment, an electrical control apparatus exclusively used for controlling the clutch connecting/disconnecting actuator 24a so as to be driven is provided, independent of the electrical control apparatus 50, and this exclusive electrical control apparatus may receive an indication signal relating to the disconnecting speed and/or connecting speed of the clutch 24 outputted from the electrical control apparatus 50 and may control the clutch connecting/disconnecting actuator 24a so as to be driven according to this indication signal.

Moreover, in the present embodiment, the driving force of the clutch connecting/disconnecting actuator 24a is controlled such that the press-contact force F of the clutch disc becomes the aforesaid force F2 that is a constant value when the clutch 24 is controlled to be brought into the half-connecting state (half-clutch state) in the half-clutch control. However, the device may be configured such that the power transmission ratio of the clutch 24 (press-contact force F of the clutch disc in the clutch 24) at the time when the clutch 24 is in the half-connecting state is changed according to a value based upon at least one of the driving wheel deceleration slip related amount (deceleration slip amount of the driving wheel R* (Vso−Vwr*), the convergence rate (convergence time Tr* of the driving wheel speed to the driving wheel R* in the pressure-down mode), the degree of the predetermined vibration (continuation time Tjudr* of the judder vibration) and revolution speed (engine revolution speed Ne) during the traction control.

In the present embodiment, in case where the half-clutch control according to the deceleration slip amount of the driving wheel is executed, the clutch 24 is controlled to be brought into the perfect disconnecting state when (at least one (the smaller one) of) the wheel speeds Vwr* of the driving wheel (at this time) is not more than the second deceleration slip determining reference value Vwref2, while the clutch 24 is controlled to be brought into the half-clutch state when (at least one (the smaller one) of) the wheel speeds Vwr* of the driving wheel (at this time) is greater than the second deceleration slip determining reference value Vwref2 and not more than the first deceleration slip determining reference value Vwref1. However, this device may be configured such that, after (at least one (the smaller one) of) the wheel speeds Vwr* of the driving wheel (at this time) is not more than the second deceleration slip determining reference value Vwref2 so that the clutch 24 is controlled to be once brought into the perfect disconnecting state, the clutch 24 is kept to be in the perfect disconnecting state until (at least one (the smaller one) of ) the wheel speeds Vwr* of the driving wheel becomes greater than the first deceleration slip determining reference value Vwref1.

Although this device is configured to change the state of the clutch to the perfect disconnecting state when the clutch is in the connecting state and the vehicle is in the spinning state in this embodiment, it may be configured to change the state of the clutch to the half-connecting state (half-clutch state) when the clutch is in the connecting state and the vehicle is in the spinning state.

What is claimed is:

1. An automatic clutch control device comprising a clutch actuator for actuating a clutch, disposed between an output shaft of a power source of a vehicle and an input shaft of a transmission, to a connecting state, a disconnecting state and a half-connecting state, and clutch control means that controls the clutch actuator comprising:
   wheel speed obtaining means for obtaining a wheel speed of each wheel of the vehicle; and
   deceleration slip related amount obtaining means for obtaining a driving wheel deceleration slip related amount that shows a degree of a slip of the driving wheel in a deceleration direction based upon each wheel speed,
   wherein the clutch control means is configured to change the state of the clutch to the half-connecting state or to the disconnecting state according to the driving wheel deceleration slip related amount when the clutch is in the connecting state.

2. An automatic clutch control device claimed in claim 1, wherein the clutch control means is configured to change the state of the clutch to the half-connecting state when the degree of the slip of the driving wheel in the deceleration direction shown by the driving wheel deceleration slip related amount is not less than a first degree but less than a second degree that is greater than the first degree, and to change the state of the clutch to the disconnecting state when the degree of the slip is not less than the second degree.

3. An automatic clutch control device that is applied to a vehicle having vehicle stabilizing control executing means for setting a target wheel speed related amount of each wheel in accordance with a running state of the vehicle and executing a vehicle stabilizing control for controlling braking force exerted on each wheel such that an actual wheel speed related amount of each wheel becomes the target wheel speed related amount, and is provided with a clutch actuator for actuating a clutch, disposed between an output shaft of a power source of the vehicle and an input shaft of a transmission, to a connecting state, a disconnecting state and a half-connecting state, and clutch control means that controls the clutch actuator, comprising:
   convergence rate obtaining means for obtaining a convergence rate showing a quality of the convergence of the actual wheel speed related amount of a driving wheel when the actual wheel speed related amount of the driving wheel converges to the target wheel speed related amount of the driving wheel from a state where the actual wheel speed of the driving wheel is smaller than the wheel speed corresponding to the target wheel speed related amount of the driving wheel when the vehicle stabilizing control is executed,
   wherein the clutch control means is configured to change the state of the clutch to the half-connecting state or to the disconnecting state according to the convergence rate when the vehicle stabilizing control is executed and the clutch is in the connecting state.

4. An automatic clutch control device claimed in claim 3, wherein the convergence rate showing a quality of the convergence is a convergence period, from when the vehicle stabilizing control is started from a state where the actual wheel speed of the driving wheel is smaller than the wheel speed corresponding to the target wheel speed related amount of the driving wheel, to when the actual wheel speed related amount is completed to be converged to the target wheel speed related amount.

5. An automatic clutch control device claimed in claim 3, wherein the clutch control means is configured to change the state of the clutch to the half-connecting state when the degree of the deterioration of the convergence shown by the convergence rate is not less than a first degree but less than a second degree that is greater than the first degree, and to change the state of the clutch to the disconnecting state when the degree of the deterioration is not less than the second degree.

6. An automatic clutch control device comprising a clutch actuator for actuating a clutch, disposed between an output shaft of a power source of a vehicle and an input shaft of a transmission, to a connecting state, a disconnecting state and a half-connecting state, and clutch control means that controls the clutch actuator comprising:
   driving system vibration determining means for determining whether a predetermined vibration occurs on a driving system from the power source to a driving wheel when the clutch is in the connecting state and the vehicle is accelerated by the power from the power source, wherein the clutch control means is configured to change the state of the clutch to the half-connecting state or to the disconnecting state according to the degree of the predetermined vibration when the clutch is in the connecting state and the predetermined vibration occurs.

7. An automatic clutch control device claimed in claim 6, wherein the degree of the predetermined vibration is a continuation time of the predetermined vibration.

8. An automatic clutch control device claimed in claim 6, wherein the predetermined vibration has an amplitude more than a predetermined amplitude and has a frequency substantially equal to a resonance frequency of the entire driving system.

9. An automatic clutch control device comprising a clutch actuator for actuating a clutch, disposed between an output shaft of a power source of a vehicle and an input shaft of a transmission, to a connecting state, a disconnecting state and a half-connecting state, and clutch control means that controls the clutch actuator comprising:
   spinning state determining means for determining whether the vehicle is in a spinning state or not,
   wherein the clutch control means is configured to change the state of the clutch to the half-connecting state or to the disconnecting state when the clutch is in the connecting state and the vehicle is in the spinning state.

10. An automatic clutch control device claimed in claim 9, wherein the spinning state determining means is configured to determine that the vehicle is in a spinning state when a state where a yaw rate of the vehicle is not less than a predetermined yaw rate reference value continues for a time longer than a predetermined spin determining reference time.

11. An automatic clutch control device that is applied to a vehicle having traction control executing means for setting a target wheel speed related amount of a driving wheel when a slip of the driving wheel in an accelerating direction excessively occurs and executing a traction control for controlling braking force exerted on the driving wheel such that an actual wheel speed related amount of the driving wheel becomes the target wheel speed related amount, and is provided with a clutch actuator for actuating a clutch, disposed between an output shaft of a power source of the vehicle and an input shaft of a transmission, to a connecting state, a disconnecting state and a half-connecting state, and clutch control means that controls the clutch actuator, comprising:

revolution speed obtaining means for obtaining a revolution speed of the power source, wherein the clutch control means is configured to change the state of the clutch to the half-connecting state or to the disconnecting state when the clutch is in the connecting state, the traction control is executed and the revolution speed is not more than a predetermined value.

* * * * *